United States Patent
Oami et al.

(10) Patent No.: US 10,614,317 B2
(45) Date of Patent: *Apr. 7, 2020

(54) IMAGE PROCESSING APPARATUS, MONITORING SYSTEM, IMAGE PROCESSING METHOD, AND PROGRAM

(71) Applicant: NEC Corporation, Tokyo (JP)

(72) Inventors: Ryoma Oami, Tokyo (JP); Hiroyoshi Miyano, Tokyo (JP); Yusuke Takahashi, Tokyo (JP); Hiroo Ikeda, Tokyo (JP); Yukie Ebiyama, Tokyo (JP); Ryo Kawai, Tokyo (JP); Takuya Ogawa, Tokyo (JP); Kazuya Koyama, Tokyo (JP); Hiroshi Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,404

(22) Filed: Mar. 5, 2019

(65) Prior Publication Data

US 2019/0266411 A1    Aug. 29, 2019

Related U.S. Application Data

(63) Continuation of application No. 15/328,666, filed as application No. PCT/JP2015/065726 on Jun. 1, 2015.

(30) Foreign Application Priority Data

Jul. 25, 2014   (JP) .................................. 2014-152336

(51) Int. Cl.
*G06K 9/00* (2006.01)
*G06F 3/13* (2006.01)
(Continued)

(52) U.S. Cl.
CPC ......... *G06K 9/00771* (2013.01); *G06F 3/013* (2013.01); *G06F 3/0416* (2013.01);
(Continued)

(58) Field of Classification Search
CPC .... H04N 13/128; H04N 13/189; H04N 13/15; H04N 13/158; H04N 13/194;
(Continued)

(56) References Cited

U.S. PATENT DOCUMENTS 9,892,606 B2 * 2/2018 Venetianer ......... G06K 9/00771
2006/0195199 A1   8/2006 Iwasaki et al.
(Continued)

FOREIGN PATENT DOCUMENTS

JP      11-161875      6/1999
JP      2001-54099     2/2001
(Continued)

OTHER PUBLICATIONS

International Search Report and Written Opinion dated Aug. 25, 2015, in corresponding PCT International Application.
(Continued)

*Primary Examiner* — Patricia I Young
(74) *Attorney, Agent, or Firm* — Finnegan, Henderson, Farabow, Garrett & Dunner, L.L.P.

(57) ABSTRACT

A state acquisition unit (2020) acquires a state of a monitoring target in a captured image captured by a camera (3040). A monitoring point acquisition unit (2040) acquires, from a monitoring point information storage unit (3020), a monitoring point corresponding to the state of the monitoring target acquired by the state acquisition unit (2020). The monitoring point indicates a position to be monitored in the captured image. A presentation unit (2060) presents the monitoring point on the captured image.

15 Claims, 21 Drawing Sheets

(51) Int. Cl.
*G06F 3/041* (2006.01)
*H04N 7/18* (2006.01)
*G06F 3/01* (2006.01)

(52) U.S. Cl.
CPC .......... *G06K 9/00778* (2013.01); *H04N 7/18* (2013.01); *H04N 7/188* (2013.01)

(58) Field of Classification Search
CPC .. H04N 13/239; H04N 13/122; H04N 13/289; H04N 5/2353; A61B 34/20; A61B 1/00009; A61B 1/00193; G02B 21/0012
USPC .......................................................... 348/45
See application file for complete search history.

(56) References Cited

U.S. PATENT DOCUMENTS

| | | |
|---|---|---|
| 2008/0312871 A1 | 12/2008 | Salcedo |
| 2012/0066646 A1 | 3/2012 | Purdy et al. |
| 2012/0092493 A1 | 4/2012 | Tsutsui et al. |
| 2013/0113934 A1 | 5/2013 | Hotta et al. |
| 2014/0070946 A1 | 3/2014 | Ambrefe, Jr. |
| 2015/0169954 A1* | 6/2015 | Schlattmann ............ G06T 7/20 382/103 |

FOREIGN PATENT DOCUMENTS

| | | |
|---|---|---|
| JP | 2002-238046 | 8/2002 |
| JP | 2004-178358 | 6/2004 |
| JP | 2007-28680 | 2/2007 |
| JP | 2008-519567 | 6/2008 |
| JP | 2011-97487 | 5/2011 |
| JP | 2012-22370 | 2/2012 |
| JP | 2012-69022 | 4/2012 |

OTHER PUBLICATIONS

Non-Final Office Action U.S. Appl. No. 16/293,449 dated Jul. 2, 2019, in the United States Patent and Trademark Office.
Notice of Allowance dated Dec. 13, 2019, by the United States Patent and Trademark Office in counterpart U.S. Appl. No. 16/293,424.

* cited by examiner

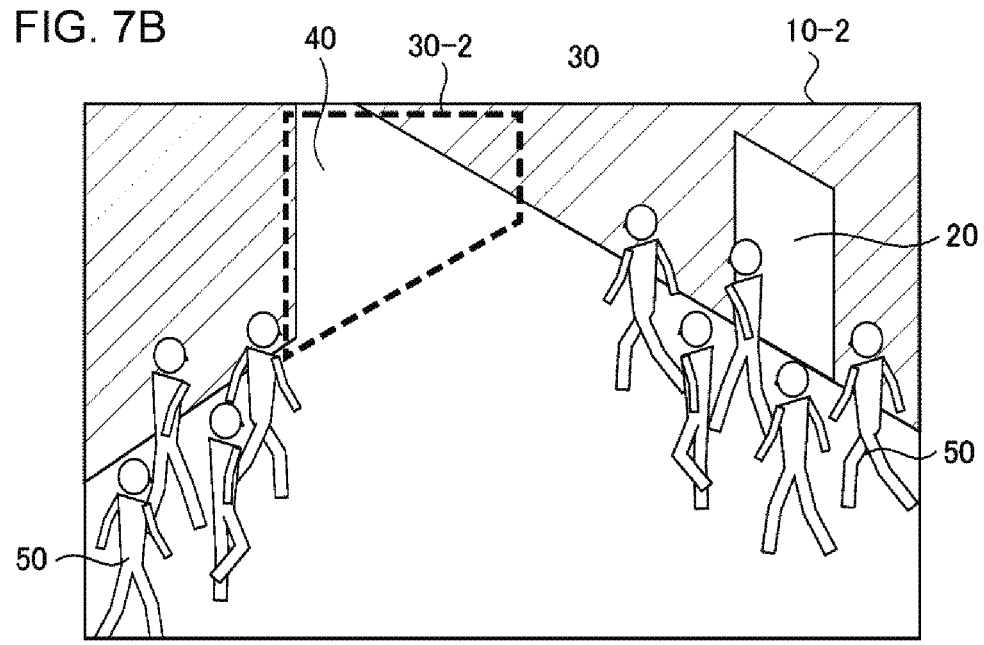

IMAGE PROCESSING APPARATUS, MONITORING SYSTEM, IMAGE PROCESSING METHOD, AND PROGRAM

CROSS-REFERENCE TO RELATED PATENT APPLICATIONS

This application is a continuation of U.S. patent application Ser. No. 15/328,666, filed Jan. 24, 2017, which is a National Stage Entry of International Application No. PCT/JP2015/065726, filed Jun. 1, 2015, which claims priority from Japanese Patent Application No. 2014-152336, filed Jul. 25, 2014. The entire contents of the above-referenced applications are expressly incorporated herein by reference.

TECHNICAL FIELD

The present invention relates to an image processing technique.

BACKGROUND ART

A method of monitoring a facility or the like includes a method of performing monitoring with viewing an image obtained by capturing an image of the facility or the like using a monitoring camera (hereinafter, a monitoring image). A technique for facilitating monitoring using a monitoring camera has been developed. For example, Patent Document 1 discloses a monitoring system that presents a frame around each item to be checked (door or the like) on a monitoring image displayed on a monitor.

RELATED DOCUMENT

Patent Document

[Patent Document 1] Japanese Unexamined Patent Application Publication No. 2001-054099

SUMMARY OF THE INVENTION

A monitoring target that an observer has to monitor is not necessarily the same and may vary depending on the situation even when the same place in captured on monitoring images. However, Patent Document 1 does not take into account the fact that a monitoring target to be monitored may vary depending on the situation.

The invention is contrived in view of the above-mentioned problem, and an object thereof is to provide a technique capable of appropriately ascertaining a place to be monitored in a captured image.

There is provided a first image processing apparatus including: a state acquisition unit acquiring a state of a monitoring target in a captured image captured by a camera; a monitoring point acquisition unit acquiring a monitoring point corresponding to the state of the monitoring target acquired by the state acquisition unit, the monitoring point indicating a position to be monitored in the captured image, and being acquired from a monitoring point information storage unit storing the state of the monitoring target and the monitoring point in association with each other; and a presentation unit presenting the monitoring point acquired by the monitoring point acquisition unit on a first captured image captured by the camera.

There is provided a first monitoring system including the first image processing apparatus, the camera, and the monitoring point information storage unit of the invention.

There is provided a first image processing method performed by a computer. The method including: acquiring a state of a monitoring target in a captured image captured by a camera; acquiring a monitoring point corresponding to the state of the monitoring target acquired by the step of acquiring the state of the monitoring target, the monitoring point indicating a position to be monitored in the captured image, and being acquired from a monitoring point information storage unit storing the state of the monitoring target and the monitoring point in association with each other; and presenting the monitoring point acquired by the step of acquiring the monitoring point on a first captured image captured by the camera.

There is provided a first program that causes a computer to operate as the first image processing apparatus of the invention by causing the computer to have functions of functional components included in the first image processing apparatus of the invention.

There is provided the second image processing apparatus including: a state acquisition unit acquiring a state of a monitoring target in a captured image captured by a camera; a monitored position acquisition unit acquiring a monitored position, which is a position monitored by an observer viewing a display screen on which the captured image is displayed; and a monitoring point information generation unit handling the monitored position as a monitoring point, and generating monitoring point information by associating the monitoring point with the state of the monitoring target, the monitoring point indicating a position to be monitored in the captured image.

There is provided a second monitoring system including the second image processing apparatus and the camera of the invention.

There is provided a second image processing method performed by a computer, the method including: acquiring a state of a monitoring target in an image captured by a camera; acquiring a monitored position, which is a position monitored by an observer viewing a display screen on which the captured image is displayed; and handling the monitored position as a monitoring point, and generating monitoring point information by associating the monitoring point with the state of the monitoring target, the monitoring point indicating a position to be monitored in the captured image.

There is provided a second program that causes a computer to operate as the second image processing apparatus of the invention by causing the computer to have functions of functional components included in the second image processing apparatus of the invention.

According to the invention, it is possible to provide a technique capable of appropriately ascertaining a place to be monitored in a captured image.

BRIEF DESCRIPTION OF THE DRAWINGS

The objects described above, and other objects, features and advantages are further made more apparent by suitable embodiments that will be described below and the following accompanying drawings.

FIGS. 7A and 7B are diagrams illustrating the presentation of a monitoring point based on the degree of congestion.

DESCRIPTION OF EMBODIMENTS

Figure 1:
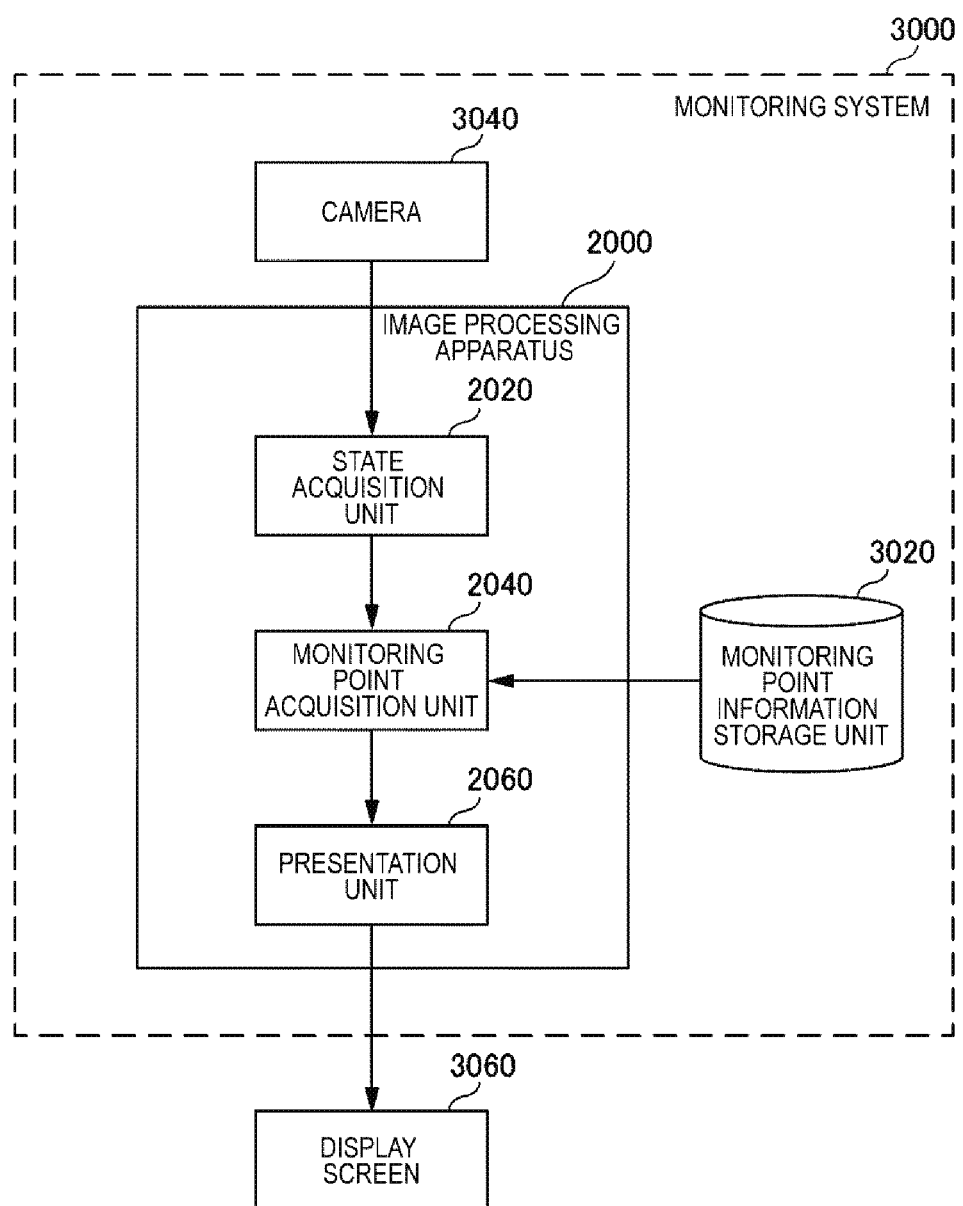
FIG. 1 is a block diagram illustrating an image processing apparatus according to a first exemplary embodiment.

Hereinafter, exemplary embodiments of the invention will be described with reference to the accompanying drawings. In all of the drawings, like reference numerals denote like components, and descriptions thereof will not be repeated.

In addition, the term "observer" used below generally refers to a person who views a captured image (which is described later) and performs monitoring, and is not limited to a person given a position named "observer".

First Exemplary Embodiment

FIG. 1 is a block diagram illustrating an image processing apparatus 2000 according to a first exemplary embodiment. In FIG. 1, an arrow indicates a flow of information. Further, in FIG. 1, each block indicates a function-based configuration instead of a hardware-based configuration.

The image processing apparatus 2000 presents a position to be monitored on an image obtained by capturing an image of a monitoring target with a camera 3040, in accordance with the state of a monitoring target such as a person (whether or not the monitoring target is moving, or the like). For this purpose, the image processing apparatus 2000 includes a state acquisition unit 2020, a monitoring point acquisition unit 2040, and a presentation unit 2060. The state acquisition unit 2020 acquires the state of a monitoring target in an image that the camera 3040 captures (hereinafter, a captured image). The camera 3040 is, for example, a monitoring camera or the like. For example, the captured image is a frame constituting a video that the camera 3040 captures. Note that, details of a monitoring target and the state of the monitoring target handled by the image processing apparatus 2000 will be described later.

The monitoring point acquisition unit 2040 acquires a monitoring point from a monitoring point information storage unit 3020 using the state of the monitoring target acquired by the state acquisition unit 2020. The monitoring point may be information indicating a position to be monitored in a captured image. Note that, the monitoring point may be a point that does not have an area or may be a region having an area. The monitoring point information storage unit 3020 stores the state of the monitoring target and the monitoring point in association with each other. The monitoring point acquisition unit 2040 acquires from the monitoring point information storage unit 3020 a monitoring point being associated with the state of the monitoring target that the state acquisition unit 2020 acquires. Note that, the number of monitoring points associated with a certain "state of a monitoring target" may be one or two or more.

The presentation unit 2060 presents a monitoring point, which the monitoring point acquisition unit 2040 acquires, on a capture image captured by the camera 3040. Hereinafter, a captured image on which a monitoring point is presented will also be described as a presentation target image.

A monitoring system 3000 is a system including the image processing apparatus 2000 and the camera 3040. The monitoring system 3000 may further include a display screen 3060. The display screen 3060 is a screen displaying a captured image that the camera 3040 captures. In addition, the display screen 3060 may display a presentation target image on which an indication of a monitoring point is presented by the presentation unit 2060. For example, the display screen 3060 is configured such that it performs switching between a mode in which a captured image captured by the camera 3040 is displayed as is and a mode in which an image processed by the image processing apparatus 2000 is displayed. As described later, a presentation target image processed by the image processing apparatus 2000 is not limited to being output to the display screen 3060.

<Flow of Processing>

Figure 2:
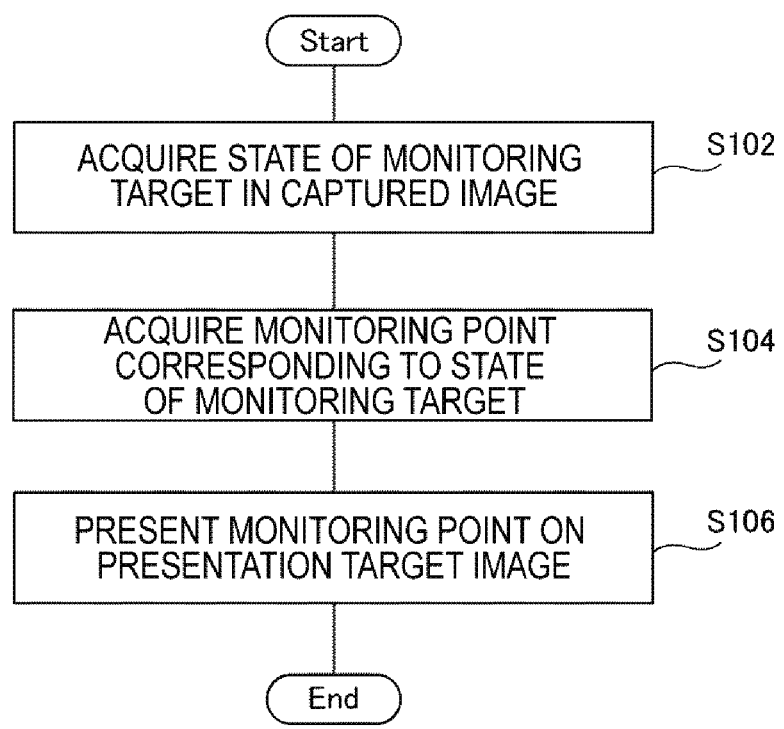
FIG. 2 is a flow chart illustrating a flow of processing that the image processing apparatus according to the first exemplary embodiment performs.

FIG. 2 is a flow chart illustrating a flow of processing that the image processing apparatus 2000 according to the first exemplary embodiment performs. In step S102, the state acquisition unit 2020 acquires the state of a monitoring target in a captured image. In step S104, the monitoring point acquisition unit 2040 acquires from the monitoring point information storage unit 3020 a monitoring point corresponding to the state of the monitoring target that the state acquisition unit 2020 has acquires. In step S106, the presentation unit 2060 presents the monitoring point that the monitoring point acquisition unit 2040 acquires, on a presentation target image.

<Operational Advantages>

According to the image processing apparatus 2000 of the present exemplary embodiment, an indication of a monitoring point corresponding to the state of a monitoring target is presented on a captured image. Thus, according to the image processing apparatus 2000, a place to be monitored is appropriately presented in a monitoring image or the like, depending on the state of a monitoring target. Accordingly, an observer or the like monitoring a monitoring image or the like can appropriately ascertain a place to be monitored in a monitoring image or the like.

Hereinafter, the image processing apparatus 2000 of the present exemplary embodiment will be described in more detail.

<Example of Hardware Configuration>

Each functional component of the image processing apparatus 2000 may be configured of hardware constituent elements (for example, an hard-wired electronic circuit or the like) which achieves each functional component, or may be configured of a combination of hardware constituent elements and software constituent elements (for example, a combination of an electronic circuit and a program for controlling the electronic circuit, or the like).

Figure 3:
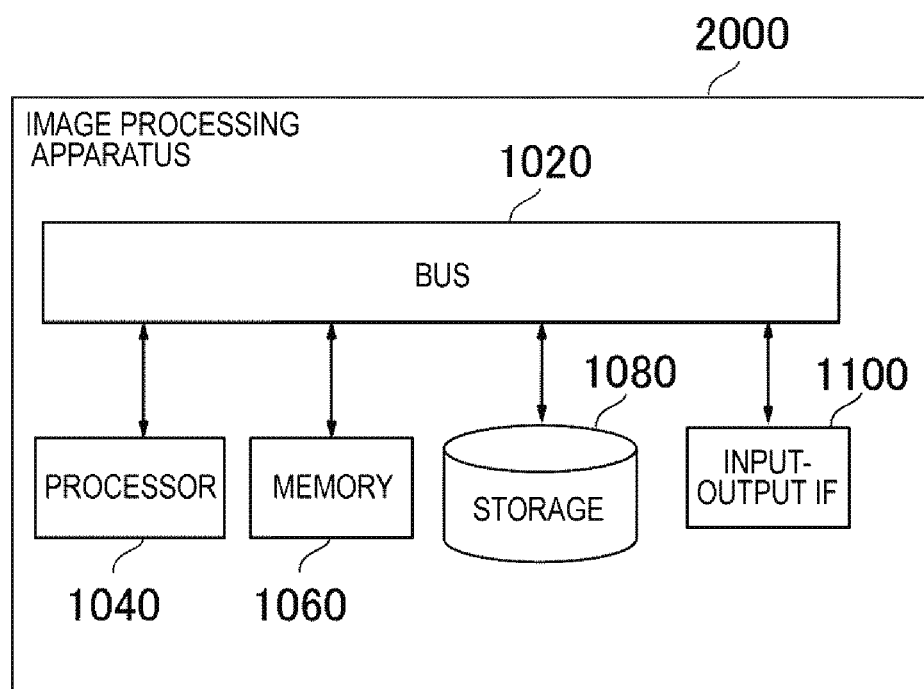
FIG. 3 is a block diagram illustrating a hardware configuration of the image processing apparatus.

FIG. 3 is a block diagram illustrating a hardware configuration of the image processing apparatus 2000. The image processing apparatus 2000 includes a bus 1020, a processor 1040, a memory 1060, a storage 1080, and an input-output interface 1100. The bus 1020 is a data transmission channel for allowing the processor 1040, the memory 1060, the storage 1080, and the input-output interface 1100 to transmit and receive data to and from each other. Here, a method of connecting the processor 1040 and the like to each other is not limited to a bus connection. The processor 1040 is an arithmetic processing device such as, for example, a central processing unit (CPU) or a graphics processing unit (GPU). The memory 1060 is a memory such as, for example, a random access memory (RAM) or a read only memory (ROM). The storage 1080 is a storage device such as, for example, a hard disk, a solid state drive (SSD), or a memory card. In addition, the storage 1080 may be a memory such as a RAM or a ROM. The input-output interface 1100 is an input-output interface for allowing the image processing apparatus 2000 to transmit and receive data to and from the monitoring point information storage unit 3020 or another external apparatus. For example, the image processing apparatus 2000 acquires information indicating the state of a monitoring target and a monitoring point through the input-output interface 1100. In addition, for example, the image processing apparatus 2000 outputs a presentation target image presenting an indication of a monitoring point thereon, through the input-output interface 1100.

The storage 1080 stores a program for implementing the function of the image processing apparatus 2000. Specifically, the storage stores program modules for implementing the respective functions of the state acquisition unit 2020, the monitoring point acquisition unit 2040, and the presentation unit 2060. The processor 1040 realizes the functions of the state acquisition unit 2020, the monitoring point acquisition unit 2040, and the presentation unit 2060 by executing the respective program modules. Here, the processor 1040 may read out the modules on the memory 1060 and then execute the modules at the time of executing the modules, or may execute the modules without reading out the modules on the memory 1060.

The hardware configuration of the image processing apparatus 2000 is not limited to the configuration illustrated in FIG. 3. For example, each program module may be stored in the memory 1060. In this case, the image processing apparatus 2000 may not include the storage 1080.

<Details of Monitoring Target>

There are various monitoring targets that the image processing apparatus 2000 handles. For example, the image processing apparatus 2000 handles objects such as a person, a thing or a set of objects (crowd or the like), as monitoring targets. Note that, an object indicating a thing may include a place. In other words, the image processing apparatus 2000 may handle a place (region) in a captured image as a monitoring target.

For example, when region included in a captured image is divided into a foreground region and a background region, an object is a foreground region. Here, the object is not limited to the above-mentioned foreground region. There are various well-known methods of extracting an object such as a person or a thing from an image, and these well-known techniques can be appropriately used to extract an object that the image processing apparatus 2000 handles. Here, such well-known techniques will not be described.

A monitoring target may be either all of objects extracted from a captured image or may be only a specific object. For example, the image processing apparatus 2000 handles only a person or a set of people (crowd) as a monitoring target. In addition, the image processing apparatus 2000 may handles only a specific person or crowd as a monitoring target. The specific object is specified by, for example, information showing a monitoring target. The information showing a monitoring target is information showing a list indicating a feature-value of the specific object (for example, a blacklist) or information showing features of an object to be monitored such as "wearing a hat" or "wearing sunglasses". Here, since a technique of extracting an object having a specific feature from objects in an image is a well-known technique, a detailed method will not be described.

<Method of Acquiring State of Monitoring Target>

The state acquisition unit 2020 acquires information indicating the state of a monitoring target (hereinafter, state information). The state information needs to be information capable of specifying to which monitoring target an indicated state is related. Here, the monitoring target is represented by, for example, a combination of "an ID of a captured image, coordinates on the captured image, and the type of a monitoring target". In this case, the state information includes "an ID of a captured image, coordinates on the captured image, the type of a monitoring target, and the state of the monitoring target".

In addition, when there are a plurality of cameras 3040, it may be distinguished which camera 3040 captures a monitoring target. In this case, state information further indicates the ID of the camera 3040, or the like.

The state information may be generated by the image processing apparatus 2000, or may be generated by an external apparatus different from the image processing apparatus 2000. When the state information is generated by the image processing apparatus 2000, the image processing apparatus 2000 acquires a captured image that the camera 3040 captures. It extracts a monitoring target from the captured image, and calculates state information indicating the state of the extracted monitoring target. A specific method of calculating state information will be described later.

Note that, when the state information is generated by an external apparatus, a process of acquiring the state information may be a process in which the state acquisition unit 2020 receives the state information output by the external apparatus, or may be a process in which the state acquisition unit 2020 reads out the state information from the external apparatus.

<Details of Presentation Unit 2060>
<<How to Indicate Monitoring Point>>

As described above, the presentation unit 2060 presents a monitoring point on a captured image that the camera 3040 captures (presentation target image). Here, there are various methods for the presentation unit 2060 to present a monitoring point. For example, the presentation unit 2060 presents a monitoring point by presenting a frame line or the like around the monitoring point. In addition, for example, the presentation unit 2060 presents a monitoring point by changing the color of the monitoring point or the color of an area around the monitoring point. Note that, a process of "changing the color of a monitoring point or the like" includes various processes such as: a process of changing the brightness, contrast, or the like of the color of the monitoring point or the like; a process of blending another color with the original color of the monitoring point or the like; a process of painting the monitoring point or the like with a specific color; and so on. In addition, the presentation unit 2060 may present a frame line or the like around a monitoring point and change the internal color thereof, or may blink the frame line or a region the color of which is changed.

Figure 4A:
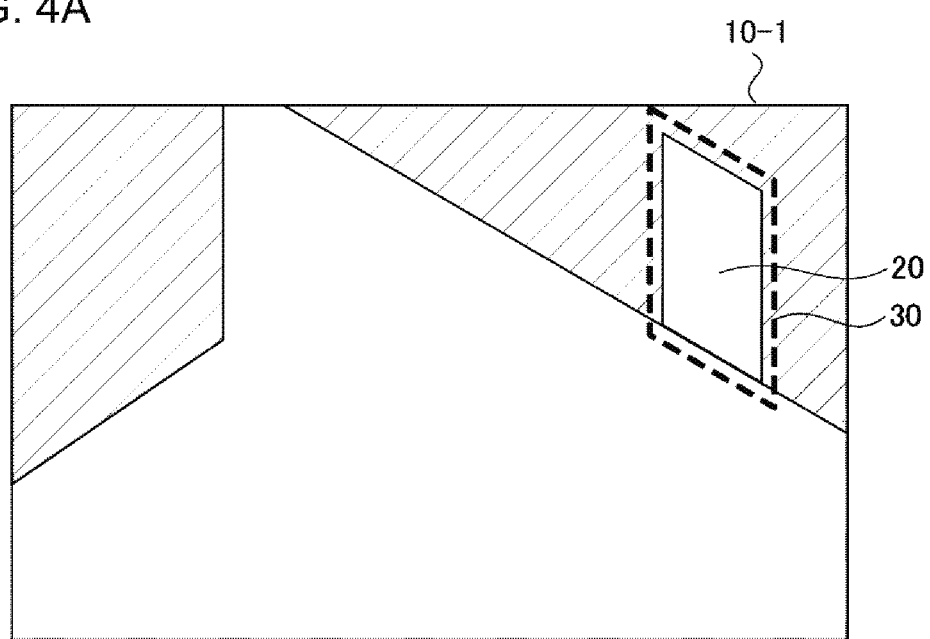
FIGS. 4A and 4B are diagrams illustrating a method of presenting a monitoring point.
Figure 4B:
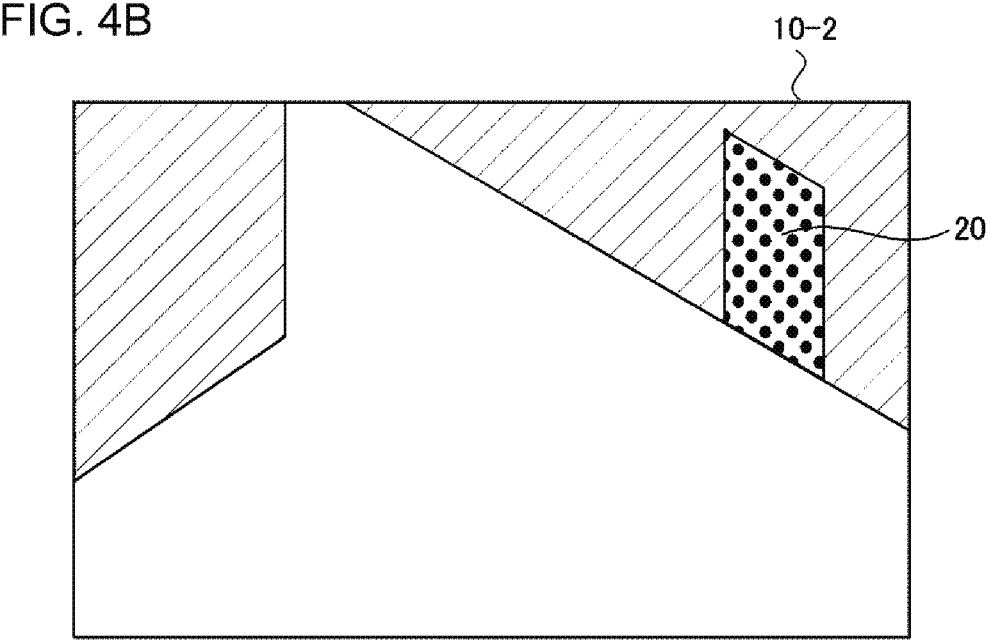

FIGS. 4A and 4B are diagrams illustrating a method of presenting a monitoring point. In FIGS. 4A and 4B, a monitoring point indicates an entrance 20. In FIG. 4A, the monitoring point is presented by presenting a frame line 30 around the entrance 20. On the other hand, in FIG. 4B, the monitoring point is presented by painting the entrance 20 with a specific color. Note that, for convenience in drawing, painting with a specific color is represented by filling with a dot pattern.

Here, the phrase "presenting a monitoring point on a presentation target image" refers to, for example, a process of embedding the monitoring point in the presentation target image or overlaying the monitoring point on the presentation target image. In this case, the presentation unit 2060 may output the presentation target image having an indication embedded therein to an output device such as the display screen 3060 or the like, or may store the presentation target image in a storage device provided inside or outside of the image processing apparatus 2000. In the latter case, the display screen 3060 or another device reads the presentation target image stored in the storage device and outputs it to the display screen 3060. Note that, the display screen 3060 is, for example, a monitor installed in a room or the like of an observer, a monitor of a mobile terminal of a security guard who performs guarding in the scene, or the like.

In addition, the presentation unit 2060 may separately generate image data presenting an indication which indicates a monitoring point, without embedding the indication in a presentation target image. In this case, the indication is presented on the presentation target image by displaying the image data together with presentation target data.

In addition, the presentation unit 2060 may present a monitoring point on a map by using map data of a facility in which the camera 3040 is installed. The map data is displayed on the display screen or the monitor of a security guard's mobile terminal or the like. The position of a monitoring target on the map can be calculated on the basis of various parameters of the camera 3040 (the installation position of the camera 3040, the orientation of the camera 3040, and the like and the position of the monitoring point (coordinates) on a captured image. In this case, the presentation unit 2060 acquires and uses map data of the facility in which the camera 3040 is installed and various parameters related to the camera 3040. Note that, a relationship between the various parameters of the camera 3040 and the position of the camera on the map is defined in advance by performing calibration or the like.

<Processing in a Case of Acquiring Plurality of Monitoring Points>

Suppose that a plurality of monitoring points have been acquired by the monitoring point acquisition unit 2040. In this case, the presentation unit 2060 may present all of the acquired monitoring points on a presentation target image or may present only some of the acquired monitoring points. When only some of the acquired monitoring points are presented, for example, priority is given to a monitoring point stored in the monitoring point information storage unit 3020. The presentation unit 2060 preferentially presents a monitoring point having higher priority among the plurality of acquired monitoring points. For example, an upper limit number of the number of monitoring points that can be presented on one presentation target image is provided. When the number of acquired monitoring points exceeds the upper limit number, the presentation unit 2060 presents the monitoring points equal to or less than the upper limit number on the presentation target image in descending order of the priority. The upper limit number is stored in advance in the storage unit provided inside or outside of the image processing apparatus 2000.

<<Relationship Between Presentation Target Image and Image Used to Generate State Information>>

A presentation target image on which a monitoring point corresponding to certain state information is presented may be a captured image used to generate the state information, or may be another captured images. In the former case, for example, the presentation unit 2060 presents a monitoring point corresponding to state information generated using first to n-th captured images on the n-th captured image. In the latter case, for example, the presentation unit 2060 presents a monitoring point corresponding to state information generated using the first to n-th captured images on an (n+1)-th captured image.

Figure 5:
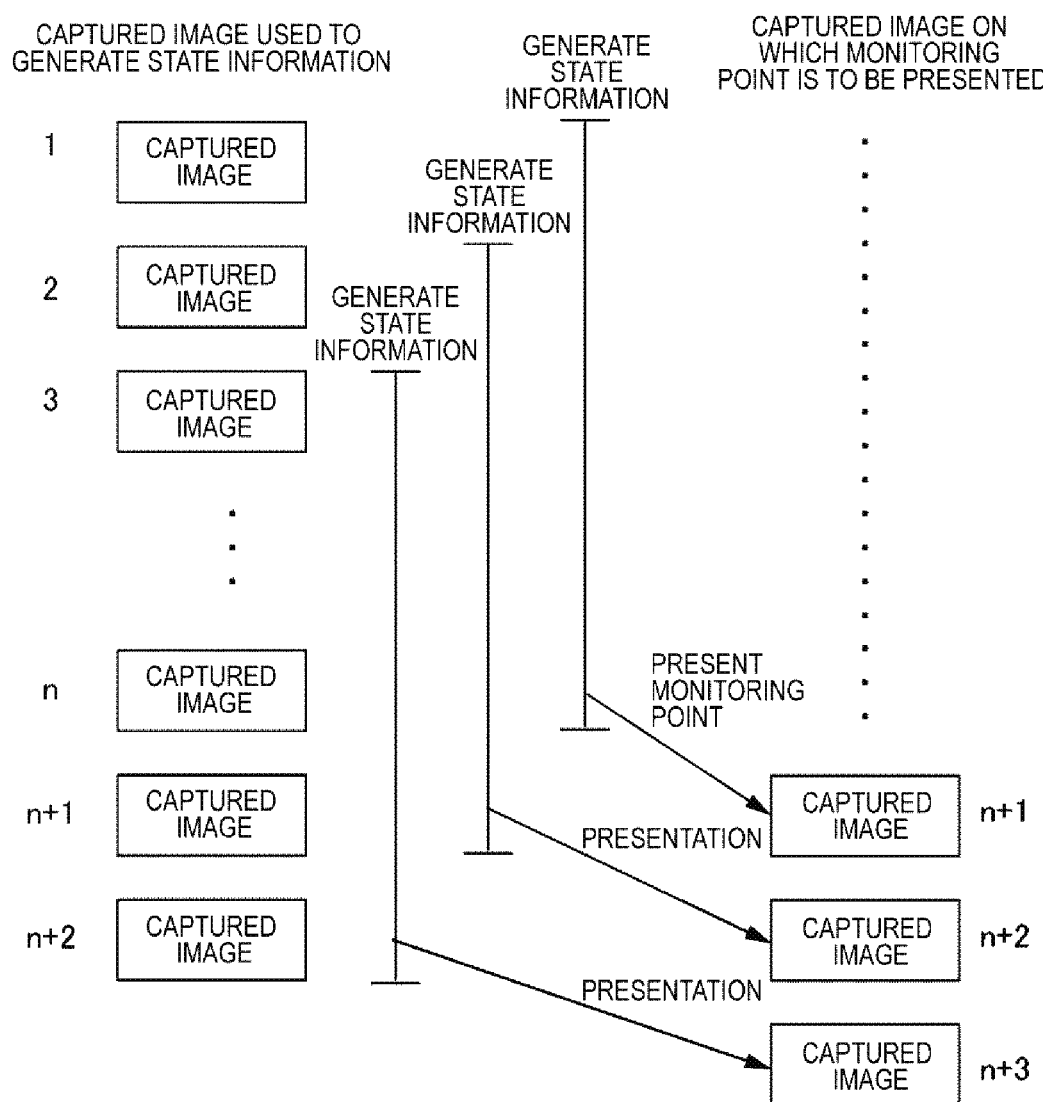
FIG. 5 is a diagram conceptually illustrating a process of generating state information for each presentation target image.

For example, state information is generated for each presentation target image. FIG. 5 is a diagram conceptually illustrating a process of generating state information for each presentation target image. In FIG. 5, the presentation unit 2060 presents a monitoring point corresponding to state information generated using first to n-th captured images on an (n+1)-th captured image. Similarly, the presentation unit 2060 presents a monitoring point corresponding to state information generated using the second to (n+1)-th captured images on an (n+2)-th captured image, and presents a monitoring point corresponding to state information generated using the third to (n+2)-th captured image on an (n+3)-th captured image.

Figure 6:
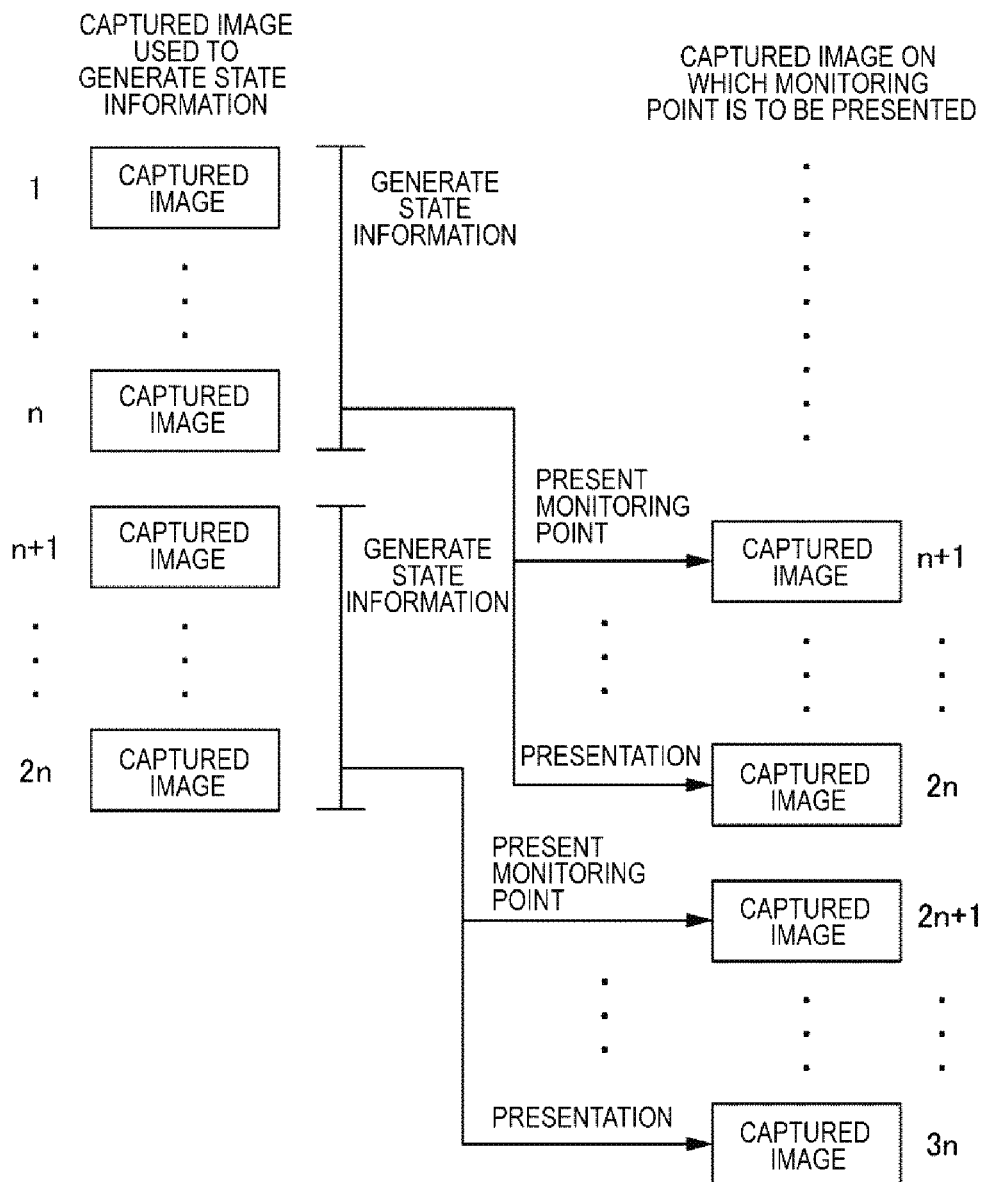
FIG. 6 is a diagram conceptually illustrating a process of presenting a common monitoring point with respect to a plurality of presentation target images.

In addition, for example, the presentation unit 2060 may use state information generated using a plurality of certain captured images in common with respect to a plurality of presentation target images. FIG. 6 is a diagram conceptually illustrating a process of presenting a common monitoring point with respect to a plurality of presentation target images. In FIG. 6, the presentation unit 2060 presents a monitoring point corresponding to state information generated using first to n-th captured images on each of (n+1)-th to 2n-th captured images. Similarly, the presentation unit 2060 presents a monitoring point corresponding to state information generated using (n+1)-th to 2n-th captured images on each of (2n+1)-th to 3n-th captured images.

<Specific Example of Monitoring Point>

A monitoring point is determined in advance in association with the state of a monitoring target. Hereinafter, a specific example showing correspondence between the state of a monitoring target and a monitoring point will be described.

<<Case where State of Monitoring Target is Degree of Congestion of Crowd>>

For example, a place to be monitored may vary depending on the degree of congestion of a place in a captured image 10. For example, when there are few people in a place, it is considered that an entrance or exit to the place (door, an end of an image, or the like) should be monitored since a person who will enter the place in the future should be observed. On the other hand, when the place is crowded, it is considered that a place into which people gather, a place through which people pass, and the like should be monitored. When there is a very narrow path, the flow of a crowd tends to be congested there, and thus it is necessary to monitor such a narrow path. Thus, the presentation unit 2060 presents a monitoring point based on the degree of congestion of a place in the captured image 10. In addition, even when the degree of congestion is the same, there is a place where risk increases suddenly when it becomes difficult for people in a crowd to watch step due to congestion, such as a place having steps. Such a place may be presented as a monitoring point.

Figure 7A:
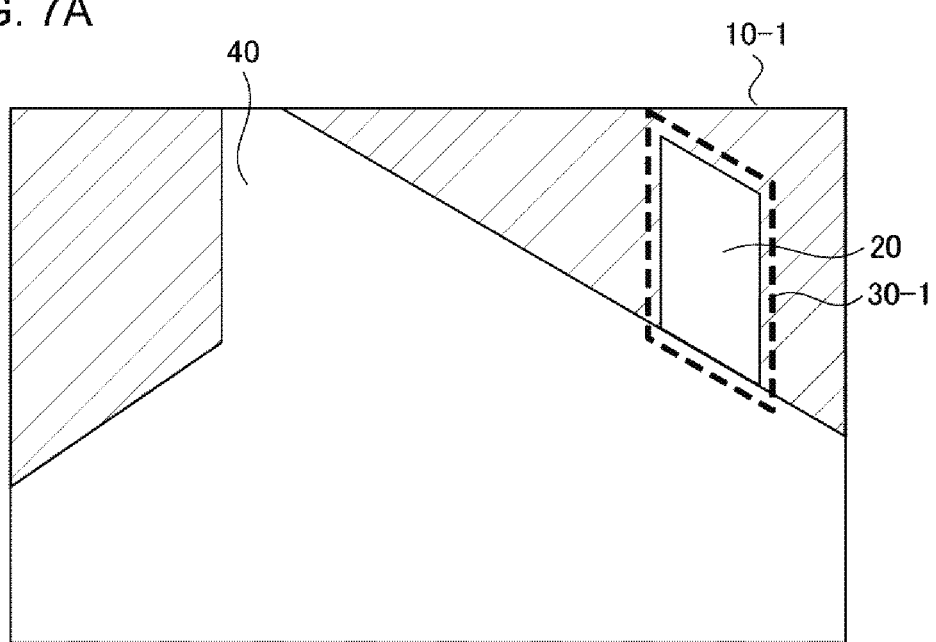

FIGS. 7A and 7B are diagrams illustrating the presentation of a monitoring point based on the degree of congestion. In the case of FIG. 7A, no person is shown in a place captured in a captured image 10, and thus there is no congestion. Thus, an entrance 20 is a monitoring point. The presentation unit 2060 therefore displays a frame line around the entrance 20.

On the other hand, in the case of FIG. 7B, a crowd 50 is shown in a captured image 10, and there is congestion. Thus, a narrow path 40 is a monitoring point. The presentation unit 2060 therefore displays a frame line in the narrow path 40.

Note that, correspondence between the above-mentioned degree of congestion and a monitoring point is merely an example. Thus, "a monitoring point is not necessarily an entrance when there is an enough space", and "a monitoring point is not necessarily a narrow path when there is congestion". For example, it could be determined that "a monitoring point is an entrance when a floor is congested with people attempting to leave a facility since a flow of people could become stuck at the entrance". A concrete correspondence between the degree of congestion and a monitoring point is determined in advance on the basis of the characteristics of the place, the characteristics of people using the place, and the like.

Monitoring point information generated on the basis of the determination is stored in the monitoring point information storage unit 3020.

Note that, although the degree of congestion indicated in state information is divided into two cases of "being congested" and "not being congested" in the above-described example, the degree of congestion indicated in a monitoring point may be divided into three or more levels. In this case, the monitoring point information storage unit 3020 stores a monitoring point in accordance with each of three or more levels of degree of congestion.

In the above-described example, although the degree of congestion indicated in state information is the degree of congestion for the entire place in the captured image 10, state information may indicate the degree of congestion for a partial region in the captured image 10. For example, state information indicates the degree of congestion for each of the vicinity of the entrance and the vicinity of the path. Thereby, as the monitoring point information, a monitoring point can be determined corresponding to the degree of congestion of each of the partial regions, such as "the case where an entrance is congested" or "the case where a path is congested".

For example, the degree of congestion can be calculated on the basis of the number of objects in the captured image 10. Specifically, a congested state is a state where the number of objects in the captured image 10 is equal to or greater than a pre-determined number. As the pre-determined number, a common value may be used for each place, or a different value may be used for each place. Note that, since a method of calculating the number of objects in the captured image 10 is well-known, the detailed description thereof will not be described here.

<<Case where State of Monitoring Target is Movement State of Crowd>>

For example, a place to be monitored may vary depending on the movement of a monitoring target in a captured image. For example, when two crowds are captured in a captured image and it is possible that they eventually intersect each other after they move, it is considered that it is preferable to monitor a position at which the crowds are expected to intersect each other in the future. Thus, the presentation unit 2060 presents a monitoring point based on the movement of a monitoring target in a captured image.

In addition, even when the crowds do not intersect each other because the flows of the crowds have the same direction, a dangerous situation may occur when the rear crowd catches up to the front crowd. For example, when the crowds flow in at interval, the slow flow of the front crowd and the fast flow of the rear crowd eventually make the rear crowd catch up to the front crowd. When this situation is repeated, the density of the crowds increases, which results in an increase in risk. Thus, in such a situation, a rear part of the front crowd, a front part of the rear crowd, a location at which the rear crowd is expected to catch up to the front crowd, or the like is presented as a monitoring point.

Figure 8A:
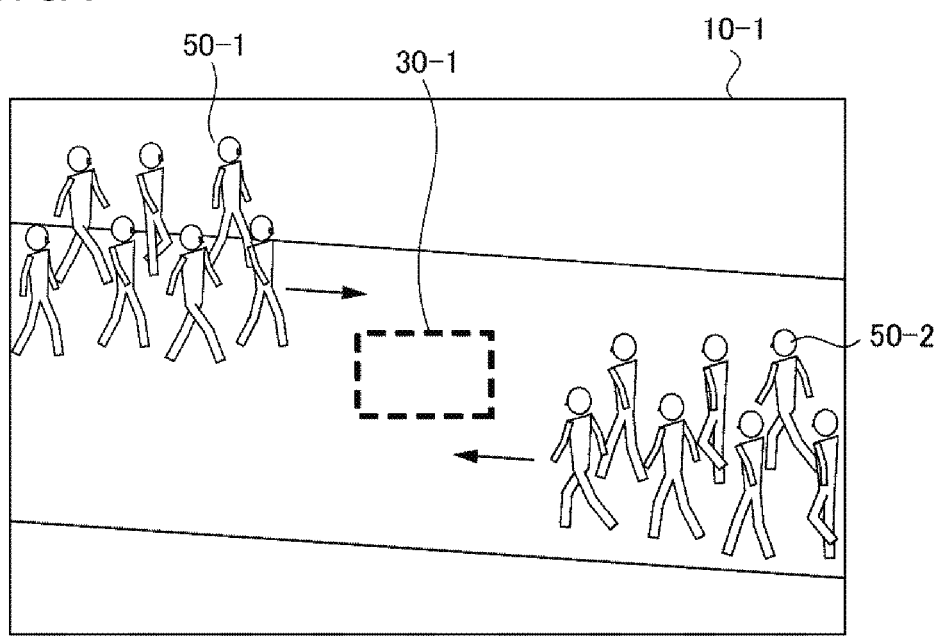
FIGS. 8A and 8B are diagrams illustrating the presentation of a monitoring point based on the movement of a monitoring target.
Figure 8B:
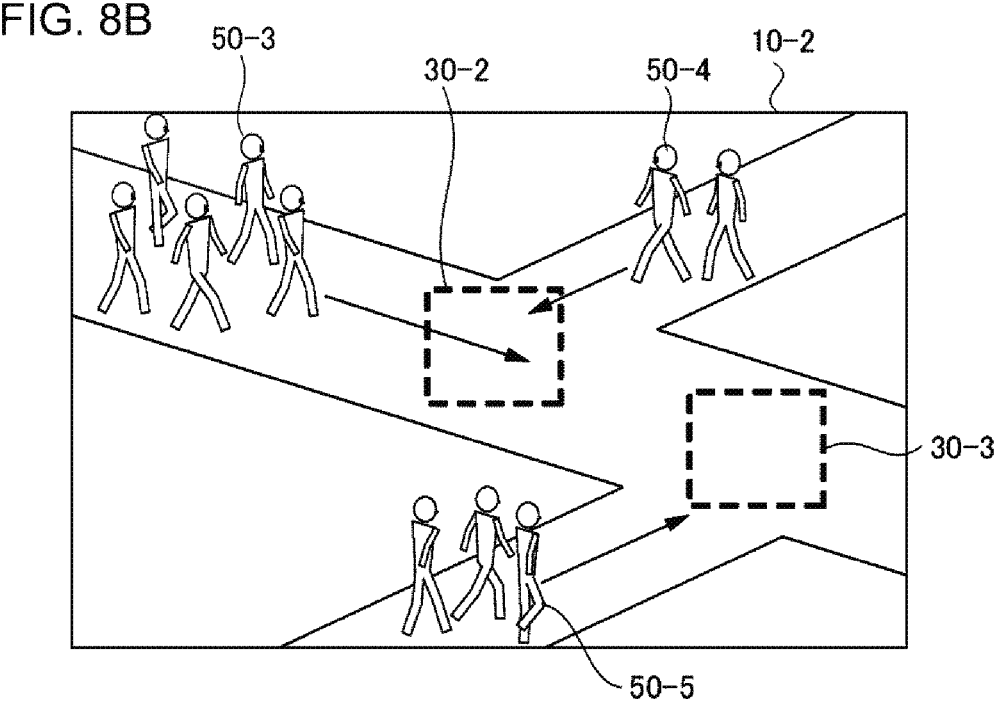

FIGS. 8A and 8B are diagrams illustrating the presentation of a monitoring point based on the movement of a monitoring target. In FIGS. 8A and 8B, monitoring targets are crowds 50. In the case of FIG. 8A, a crowd 50-1 is moving in a rightward direction, and a crowd 50-2 in moving in a leftward direction. In this case, the presentation unit 2060 presents a frame line 30-1. The frame line 30-1 indicates a position and its vicinity where the crowd 50-1 and the crowd 50-2 are expected to intersect each other when the crowds continue proceeding.

In the case of FIG. 8B, a crowd 50-3, a crowd 50-4, and a crowd 50-5 are moving. The presentation unit 2060 displays a frame line 30-2 at a position and its vicinity where the crowd 50-3 and the crowd 50-4 will be expected to intersect each other later, and displays a frame line 30-3 at a position and its vicinity where the crowd 50-3 and the crowd 50-5 will be expected to intersect each other later.

In this manner, when the movement of a monitoring target is handled as a state of the monitoring target, for example, monitoring point information indicates information of "state: being in motion, monitoring point: location at which intersection is expected to occur". As a result of acquiring a monitoring point of "a location at which intersection is expected to occur", the presentation unit 2060 calculates the location at which the intersection of the crowds is expected to occur, and performs presentation for displaying the location.

For example, in the case of FIG. 8B, the state acquisition unit 2020 acquires a state of "being in motion" with respect to each of the crowds 50-3 to 50-5. The monitoring point acquisition unit 2040 acquires a monitoring point of "location at which intersection is expected to occur" corresponding to the state of "being in motion" with respect to each of the crowds 50-3 to 50-5. The presentation unit 2060 calculates a location at which intersection is expected to occur, with respect to each combination of the crowds 50-3 to 50-5, and presents a monitoring point in each calculated location.

Note that, the location at which intersection is expected to occur is not limited to a location at which the crowds 50 are expected to intersect each other as in the above-described example. For example, when an obstacle such as a wall is present in the direction in which the crowd 50 is moving, the presentation unit 2060 presents a monitoring point on the obstacle and its vicinity.

The movement of the crowd 50 can be calculated on the basis of a change in the position of the crowd 50 in a plurality of captured images 10 in which the crowd 50 is shown. Here, the movement of the crowd 50 is the speed, moving direction, or the like of the crowd 50. Note that, a method of calculating the movement of a crowd using a plurality of captured images is well-known, and thus the detailed description thereof will not be described.

Note that, the number of people included in the crowd 50 may be one or two or more.

<<Case where State of Monitoring Target is Alignment State of Queue>>

When a crowd in a captured image forms a queue, it is considered that a place to be monitored varies depending on the state of the queue. For example, when the queue extends in an appropriate direction (direction along a path or a rope, or the like), the queue is correctly aligned, and thus it may be said that there is low risk in the middle of the queue. In this case, it is considered that the end of the queue to which a person is newly added may be preferably monitored. Thus, the monitoring point information storage unit 3020 stores monitoring point information of "state of monitoring target: queue is aligned, monitoring point: end of queue".

On the other hand, for example, when the queue meanders without moving along an appropriate direction, it is considered that a problem tends to occur. For example, it is expected that a problem tends to occur at each location at which a queue is bent. For this reason, the monitoring point information storage unit 3020 stores monitoring point information of "state of monitoring target: queue is not aligned, monitoring point: location at which queue is bent and end of queue".

Even in a state where a queue is aligned, on a platform of a station or the like, there is narrower room around the end of a queue as the queue becomes longer, and thus the amount of people walking the edge of the platform increases or the amount of people attempting to pass through a narrow location around the end of the queue increases, which may result in an increase in the risk of danger. Thus, even in a state where the queue is aligned, the end of the queue or the edge of the platform may be presented as a monitoring point when the length of a queue is increased or the width of a passage around the end of the queue becomes narrower. In this case, for example, an acceptable value of the length of the queue or the width of the platform may be stored in advance inside or outside the image processing apparatus 2000.

Figure 9A:
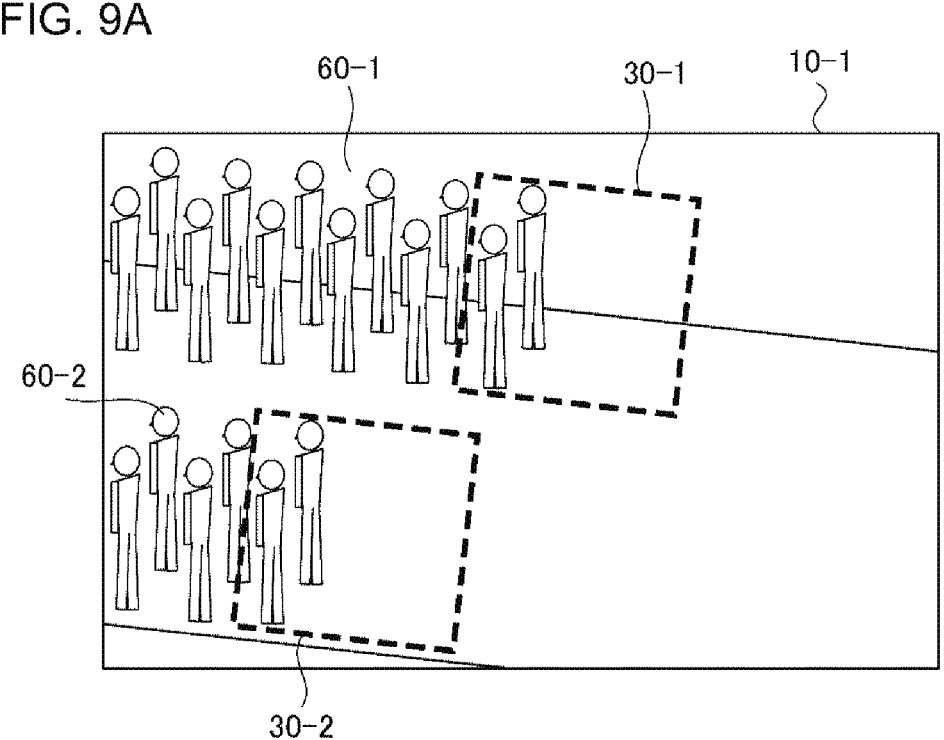
FIGS. 9A and 9B are diagrams illustrating the presentation of a monitoring point based on the state of a queue.
Figure 9B:
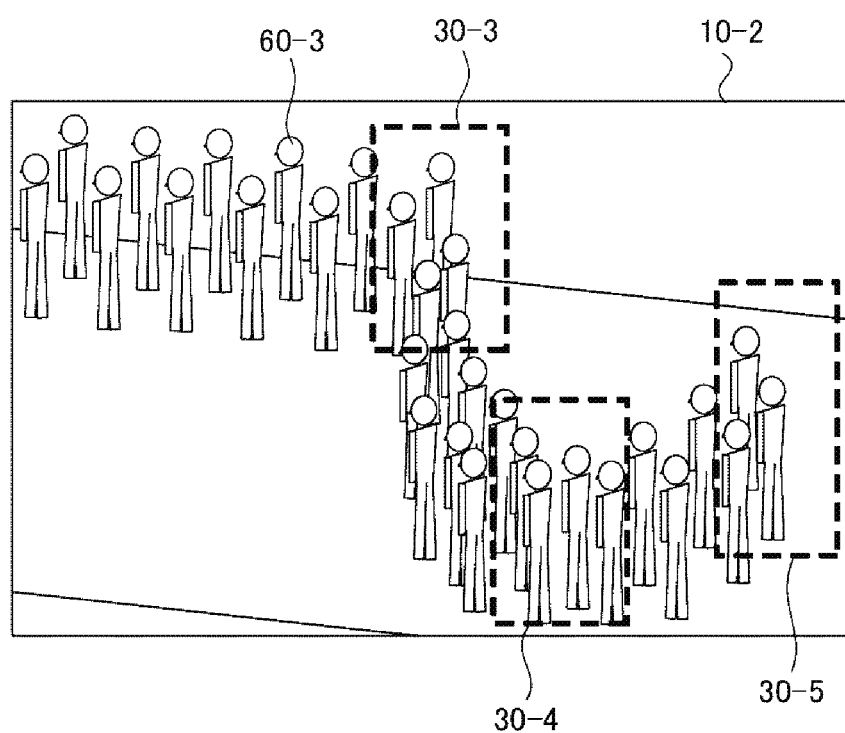

FIGS. 9A and 9B are diagrams illustrating the presentation of a monitoring point based on the state of a queue. In FIGS. 9A and 9B, a monitoring target is a queue 60. In the case of FIG. 9A, a queue 60-1 and a queue 60-2 are aligned in a rightward direction. Thus, the presentation unit 2060 presents a frame line 30-1 and a frame line 30-2 at the ends of the queue 60-1 and the queue 60-2, respectively. On the other hand, in the case of FIG. 9B, a queue 60-3 meanders. Thus, the presentation unit 2060 presents a frame line 30-3 and a frame line 30-4 at a location where the queue 60-3 meanders, and further presents a frame line 30-5 at the end of the queue 60-3.

The state of a queue can be calculated by analyzing a line of objects in a captured image 10. A method of determining "whether or not a queue is formed straight or meanders" or "whether or not the direction of a queue is an appropriate direction" is well-known. In addition, a method of calculating a location where a queue meanders is also well-known. Thus, these well-known methods will not be described here.

For example, the "appropriate direction of a queue" is determined in advance in association with the camera 3040. For example, when the orientation of the camera 3040 is fixed and the position of a target for which a queue waits (register counter of a shop, or the like) is fixed, a direction in which the queue 60 is formed straight can be determined in advance as an "appropriate direction of a queue".

In addition, for example, the "appropriate direction of a queue" may be calculated using the captured image 10. Specifically, when the queue 60 is formed straight, the direction of the queue 60 is calculated, and the direction is set as an "appropriate direction of a queue". In addition, when the queue 60 is bent in the middle thereof, for example, a guideline such as a rope is extracted from the captured image 10, and a direction along the guideline is set as an "appropriate direction of a queue".

<<Determination of Monitoring Point Using Plurality of Cameras>>

Figure 10A:
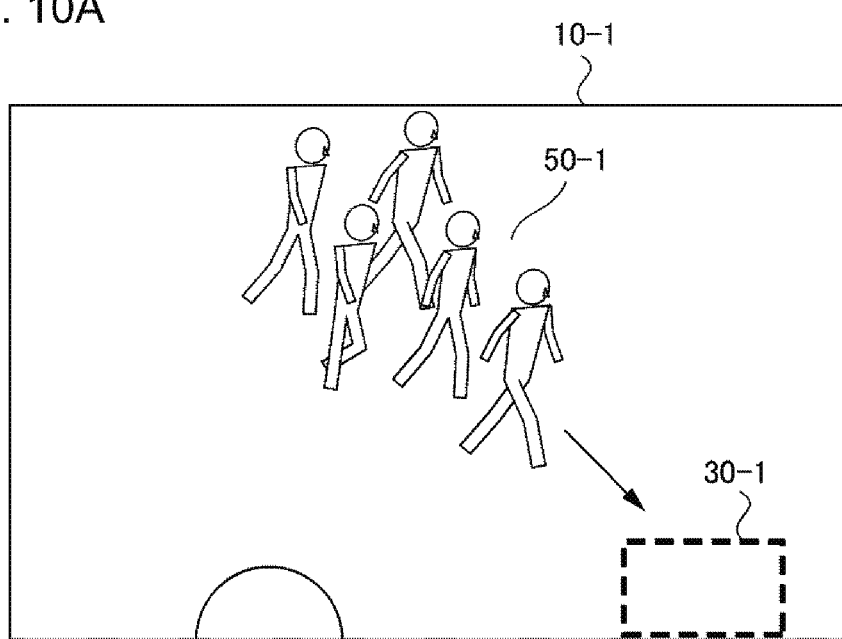
FIGS. 10A and 10B are diagrams illustrating two captured images captured by two different cameras
Figure 10B:
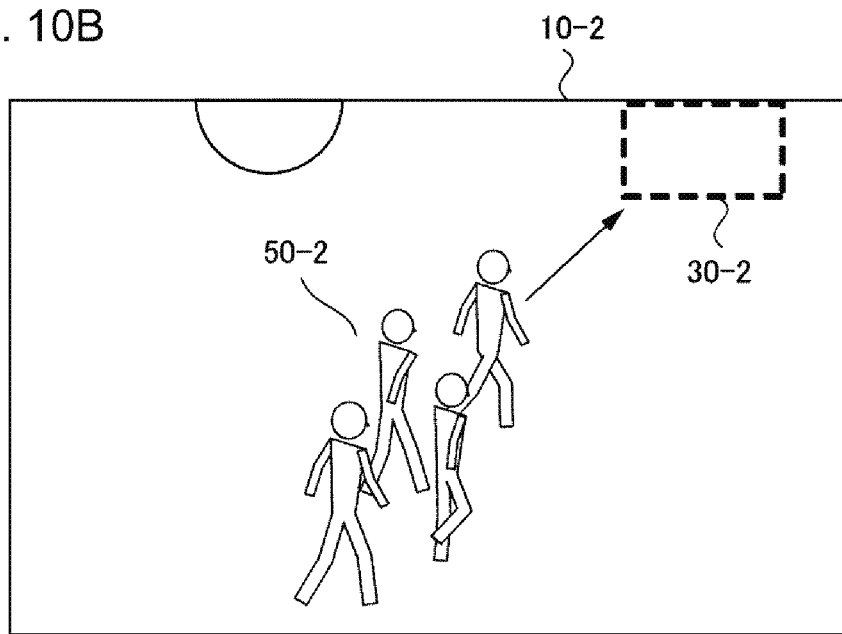

The image processing apparatus 2000 may use information obtained from a plurality of images captured by different cameras 3040. FIGS. 10A and 10B are diagrams illustrating two captured images 10 which are captured by two different cameras 3040. A captured image 10-1 and a captured image 10-2 are images obtained by capturing adjacent places, and the lower end of the captured image 10-1 is continuous with the upper end of the captured image 10-2.

A crowd 50-1 is shown in the captured image 10-1, and a crowd 50-2 is shown in the captured image 10-2. Here, when viewing only the captured image 10-1, an obstacle is not present in a movement destination of the crowd 50-1, and thus it seems like there is no location that should be monitored in the movement destination of the crowd 50-1. This is the same when viewing only image 10-2. An obstacle and the like are not particularly shown in a movement destination of the crowd 50-2 shown in the captured image 10-2.

However, when viewing the captured image 10-1 and the captured image 10-2 together, the crowd 50-1 and the crowd 50-2 can be expected to eventually intersect each other. In this manner, the image processing apparatus 2000 also performs presentation for a monitoring target that cannot be identified unless a plurality of captured images are viewed together. For example, the operation is as follows.

First, the state acquisition unit 2020 acquires the state of each of the monitoring targets captured by the plurality of cameras 3040. In the case of FIGS. 10A and 10B, the state acquisition unit 2020 acquires both the state of the crowd 50-1 in the captured image 10-1 and the state of the crowd 50-2 in the captured image 10-2. Since the crowd 50-1 and the crowd 50-2 are in motion, the monitoring point acquisition unit 2040 acquires a "location at which intersection is expected to occur" as a monitoring point corresponding to each of the crowds. The presentation unit 2060 calculates a location at which the crowd 50-1 and the crowd 50-2 are expected to intersect each other, from the moving directions of the crowd 50-1 and the crowd 50-2 and a positional relationship between places in the captured image 10-1 and the captured image 10-2. The presentation unit 2060 presents a frame line 30 and the like at the calculated location. In FIGS. 10A and 10B, a frame line 30-1 is presented in the captured image 10-1, and a frame line 30-2 is presented in the captured image 10-2.

Note that, when there is a large number of cameras 3040, a process of expecting intersection which is performed for all combinations of moving monitoring targets results in an increase in a calculation amount, and thus the time required for the process could be long. Thus, the presentation unit 2060 may perform a process of expecting intersection for only monitoring targets that are located close to each other. For example, the presentation unit 2060 expects intersection only for monitoring targets in the respective captured images captured by the adjacent cameras 3040. In this case, state information acquired by the state acquisition unit 2020 indicates an ID of the camera 3040 that captures a monitoring target. The presentation unit 2060 obtains IDs of the adjacent cameras and the positional relationship therebetween using information indicating the positional relationship between the cameras 3040, and expects intersection. Note that, the information indicating the positional relationship between the cameras 3040 may be stored inside or outside of the image processing apparatus 2000.

<Details of Method of Generating State Information>

As described above, there are various states of a monitoring target. Thus, in order to generate state information, it is necessary to determine to which state the state of a monitoring target corresponds. For that purpose, for example, a feature-value of a monitoring target (density, flow, and distribution of a crowd, and the like) which is obtained from one or a plurality of captured images is used as an input, and a model for determining whether or not the monitoring target corresponds to a state is generated in advance for each state. For example, the model is generated by being subjected to machine learning in advance using training data that includes a combination of "a feature-value of a monitoring target and a state of the monitoring target". Then, a feature-value of a crowd which is obtained from a captured image is input to a model generated for a certain state, and thus it is determined whether or not a monitoring target in the captured image corresponds to the state.

For example, when a feature-value of a monitoring target is input to a model of a congestion state, an output of "being congested" or "not being congested" is obtained. In addition, for example, when a feature-value of a monitoring target is input to a model of a queue state, an output of "no queue is formed", "an aligned queue is formed", or "a non-aligned queue is formed" is obtained.

Note that, the above-mentioned model may be configured so as to calculate "likelihood of correspondence to a state". For example, when a feature-value of a monitoring target is input to a model of a queue state, the likelihood for each of the states of "no queue is formed", "an aligned queue is formed", and "a non-aligned queue is formed" is obtained. In this case, state information of a certain monitoring target is generated on the basis of the likelihood obtained by inputting the feature-value of the monitoring target to the model. Specifically, state information of a certain monitoring target indicates a state corresponding to the highest likelihood among the states corresponding to the respective likelihoods obtained by inputting the feature-value of the monitoring target to the model.

In addition, state information may include likelihood. In this case, the presentation unit 2060 may present a monitoring point in consideration of the likelihood indicated in the state information. For example, the presentation unit 2060 presents only a monitoring point corresponding to state information in which the likelihood has a value equal to or greater than a pre-determined value, on a presentation target image.

Note that, a crowd in a captured image may correspond to a plurality of states. For example, when a monitoring target forming an aligned queue is moving, the state of the monitoring target corresponds to both of "an aligned queue is formed" and "being in motion". In this case, state information may be generated for all of the corresponding states, or may be generated for only some states. When state information is generated for only a portion of the states, for example, the above-mentioned likelihood is used. Specifically, there are two methods: 1) state information is generated for only top n states in a case where states are aligned in descending order of the likelihood and 2) state information is generated for only states having a likelihood equal to or greater than a pre-determined value.

Second Exemplary Embodiment

Figure 11:
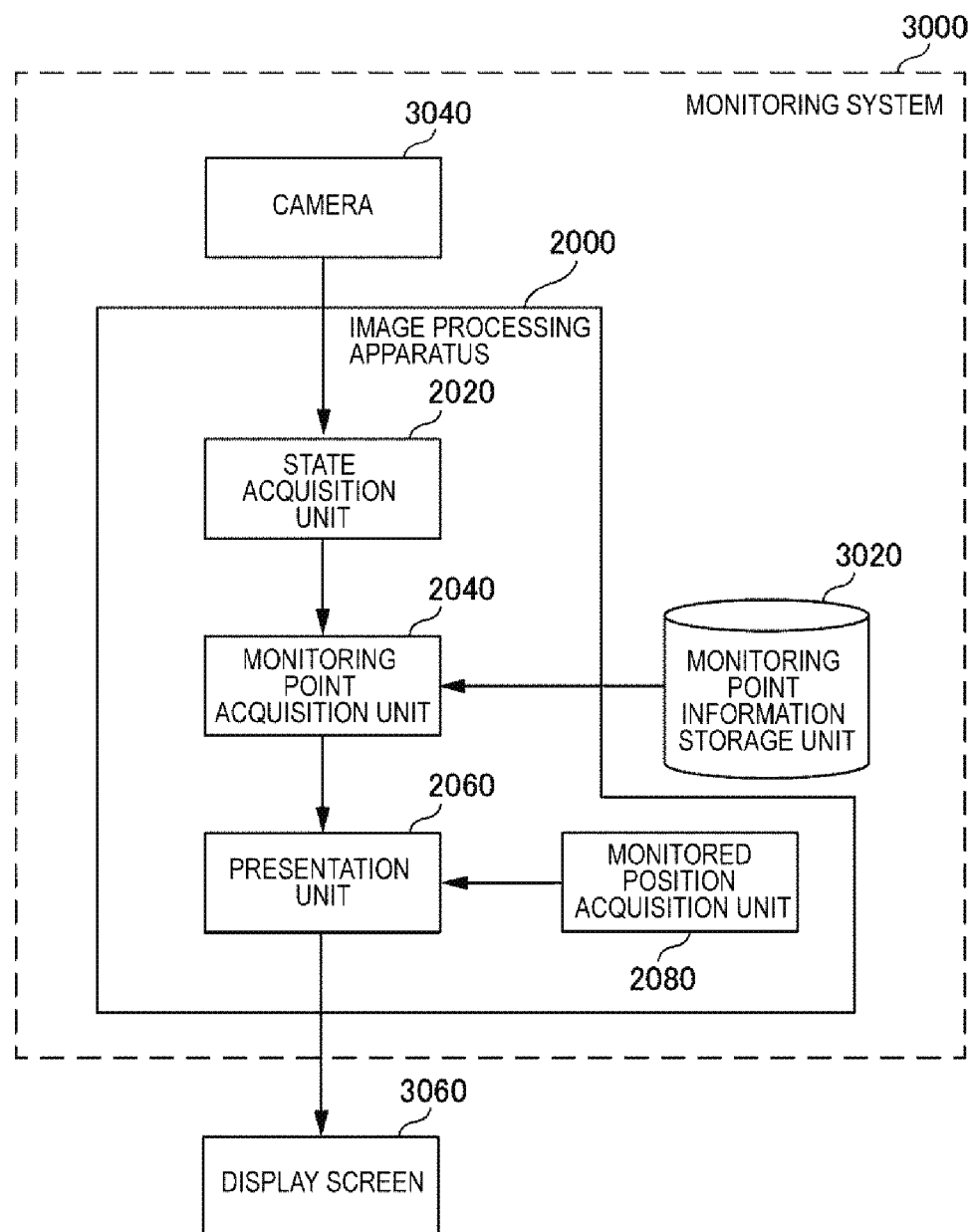
FIG. 11 is a block diagram illustrating an image processing apparatus with its usage environment according to a second exemplary embodiment.

FIG. 11 is a block diagram illustrating an image processing apparatus 2000 according to a second exemplary embodiment together with the use environment thereof. In FIG. 11, an arrow indicates a flow of information. Further, in FIG. 11, each block indicates a function-based configuration instead of a hardware-based configuration.

The image processing apparatus 2000 according to the second exemplary embodiment includes a monitored position acquisition unit 2080 that acquires a monitored position. The monitored position is a position which is monitored by an observer viewing a display screen on which a captured image is displayed. Here, a process of calculating a monitored position may be performed inside the image processing apparatus 2000 or may be performed outside of the image processing apparatus 2000.

The presentation unit 2060 preferentially presents, on the presentation target image, a monitoring point whose presentation location is not at or around the monitored position on the display screen acquired by the monitored position acquisition unit 2080, among monitoring points acquired by the monitoring point acquisition unit 2040.

The monitored position is determined with various methods. Hereinafter, a method of representing a monitored position will be described.

<Determination Method Based on Observer's Eye Gaze Direction>

For example, a monitored position is determined on the basis of the eye gaze direction or the orientation of the face (hereinafter, a face direction) of an observer. In this case, the monitored position is an intersection point between the display screen 3060 and the eye gaze direction or face direction of the observer, or the vicinity of the intersection point. Here, "the vicinity of the intersection point" is a region having a pre-determined shape, a circular region having a pre-determined radius, or the like, and the center thereof is the intersection point. In addition, a display screen may be divided into pre-determined partial regions in advance, and the partial region intersecting the observer's eye gaze direction or the like may be handled as a monitored position. Note that, information indicating the above-mentioned pre-determined shape and pre-determined radius may be stored in advance in a storage device provided inside or outside of the image processing apparatus 2000.

Here, for example, when an observer monitors a certain position only for a short period of time, it is considered that the position would be insufficiently monitored. Thus, for example, only a position that is continuously monitored for a pre-determined period of time or longer or a position which is monitored at a frequency higher than a pre-determined frequency may be handled as a monitored position. Information indicating the predetermined period of time and the predetermined frequency is stored in advance in a storage device provided inside or outside of the image processing apparatus 2000.

For example, information that the monitored position acquisition unit 2080 acquires is coordinate information indicating a monitored position which is calculated by an external apparatus on the basis of the eye gaze direction, face direction of an observer, or the like. In addition, for example, information that the monitored position acquisition unit 2080 acquires is information indicating the eye gaze direction or face direction of an observer. In this case, the presentation unit 2060 calculates coordinate information indicating a monitored position on the basis of the information acquired by the monitored position acquisition unit 2080 or the like.

For example, the eye gaze direction or face direction of an observer is represented by a combination of "the position of the observer, an angle in a horizontal direction, and an angle in a vertical direction". Here, a reference of each of the angle in the horizontal direction and the angle in the vertical direction (direction handled as 0 degree) is arbitrary. In addition, a reference of the position of the observer (position handled as the origin) is arbitrary.

For example, the eye gaze direction or face direction of an observer is calculated by capturing the face or eyes of the observer with a camera or the like and analyzing the captured images. The camera capturing the face and eyes of the observer is installed, for example, near a display screen 3060. Since a technique of capturing the face or eyes of an observer for detecting an eye gaze direction or a face direction is well-known, the detailed description thereof will not be described here. Note that, a processing unit that detects the eye gaze direction or face direction of an observer (hereinafter, an eye gaze direction detection unit) may be provided inside or outside of the image processing apparatus 2000.

Figure 12:
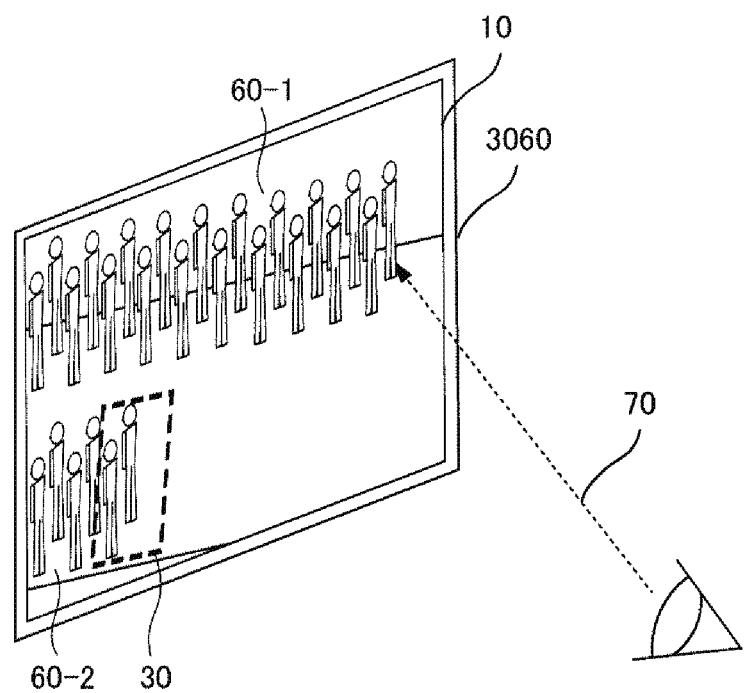
FIG. 12 is a diagram conceptually illustrating that a monitoring point to be presented is determined on the basis of an observer's eye gaze direction.

FIG. 12 is a diagram conceptually illustrating that a monitoring point to be presented is determined on the basis of an observer's eye gaze direction. A captured image 10 is a captured image that the camera 3040 captures and on which a frame line 30 is presented by the presentation unit 2060 after that. In FIG. 12, the captured image 10 is displayed on the display screen 3060, and is monitored by an observer. Here, the captured image 10 of FIG. 12 shows the same situation as those of the captured image 10-1 in FIG. 9A. Specifically, two queues 60-1 and 60-2 are displayed on the captured image 10.

In FIG. 12, similarly to the case of FIG. 9A, the monitoring point acquisition unit 2040 acquires an "end" as a monitoring point for each of queues 60. Here, an eye gaze direction 70 of an observer faces the end of the queue 60-1. In other words, the end of the queue 60-1 is the above-described monitored position. Thus, the presentation unit 2060 presents the frame line 30 at the end of the queue 60-2 which is not included in the monitored position or the vicinity thereof.

Note that, although the presentation unit 2060 does not present a monitoring point which is included in the monitored position or the vicinity thereof in FIG. 12, it may present a monitoring point which is included in a monitored position or the vicinity thereof. In this case, for example, the presentation unit 2060 emphasizes a monitoring point not included in a monitored position or the vicinity thereof more than a monitoring point included in a monitored position or the vicinity thereof. Here, there are various methods of emphasizing a monitoring point. For example, when a frame line is presented around a monitoring point, emphasizing is performed by increasing the thickness of the frame line. In addition, when a monitoring point is presented by changing the color of a monitoring point, emphasizing is performed by using a more noticeable color. In addition, emphasizing may be performed by blinking a frame line and region of a monitoring point. In this case, emphasizing is performed by more rapidly blinking a monitoring point as the importance thereof becomes higher.

<Determination Method Based on Direction Indicated by Observer>

A monitored position may be determined based on a direction that an observer's hand or finger indicates by using the similar method to the method of determining a monitored position based on the eye gaze direction or face direction of an observer.

<Determination Method based on Position Touched by Observer>

Further, a position on the display screen 3060 which is touched by an observer or the vicinity thereof may be handled a monitored position. The position on the display screen 3060 which is touched by the observer can be determined by, for example, using as the display screen 3060 a screen (touch panel or the like) with which the position touched by the observer can be detected. In addition, the position on the display screen 3060 which is touched by the observer can be determined by also monitoring the observer's movement with respect to the display screen 3060 using a camera or the like. Note that, it may possible to handle as a monitored position only a position which is touched by an observer for a pre-determined period of time or longer or only a position touched at a frequency higher than a pre-determined frequency.

<Flow of Processing>

Figure 13:
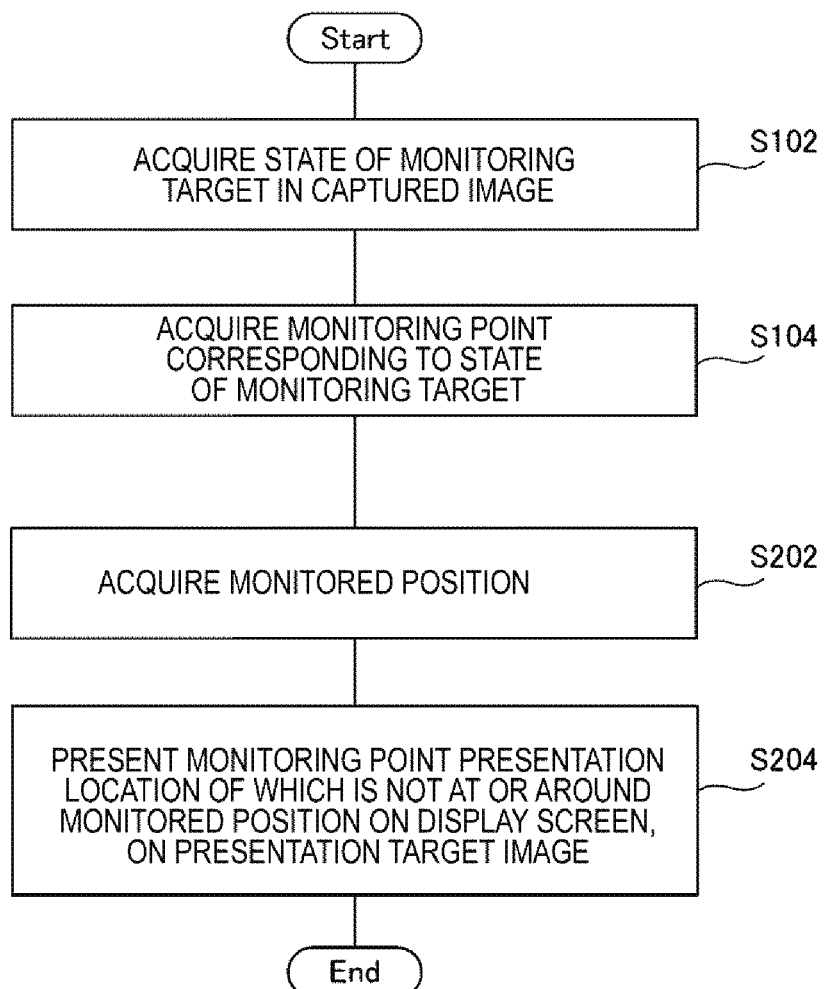
FIG. 13 is a flow chart illustrating a flow of processing that the image processing apparatus according to the second exemplary embodiment performs.

FIG. 13 is a flow chart illustrating a flow of processing performed by the image processing apparatus 2000 according to the second exemplary embodiment. Note that, step S102 and step S104 of FIG. 13 are the same processes as step S102 and S104 of FIG. 2, respectively, and thus those processes will not be described here.

In step S202, the monitored position acquisition unit 2080 acquires a monitored position. In step S204, the presentation unit 2060 preferentially presents, on the presentation target image, a monitoring point the location of which is not at or around the monitored position on the display screen acquired by the monitored position acquisition unit 2080, which monitoring point is acquired by the monitoring point acquisition unit 2040.

<Operational Advantages>

According to the present exemplary embodiment, a monitoring point which is not included in a position monitored by an observer or a position in the vicinity thereof (monitored position) is displayed on the display screen 3060. Thus, it is achieved to prevent the observer from neglecting monitoring by presenting a frame line or the like for a monitoring point that the observer does not monitors, and to prevent the visibility of a monitoring location from deteriorating.

Third Exemplary Embodiment

An image processing apparatus 2000 according to a third exemplary embodiment has the same configuration as that of the image processing apparatus 2000 according to the first or second exemplary embodiment, and has the same function as that of the image processing apparatus 2000 according to the first or second exemplary embodiment except for the following description.

In the third exemplary embodiment, a monitoring point is associated with a state of a monitoring target and another element (hereinafter, a second element). The monitoring point acquisition unit 2040 acquires the state of the monitoring target and the second element, and acquires a monitoring point corresponding thereto. Hereinafter, a specific example of the above-mentioned second element will be described.

<Schedule Information>

For example, a second element is schedule information indicating a date, a day of the week, a time, or the like. There are locations for which the necessity of monitoring varies according to the situations; some locations are safe in the daytime but are dangerous in the nighttime, other locations are safe on weekdays but are dangerous on weekends and on national holidays.

Thus, the monitoring point information storage unit 3020 stores a monitoring point in association with the state of the monitoring target and schedule information. The monitoring point acquisition unit 2040 acquires schedule information in addition to the state of the monitoring target, and acquires a monitoring point corresponding to a combination thereof. Thereby, it is possible to acquire an appropriate monitoring point based on time.

<Weather Information>

For example, a second element is weather information indicating weather (the weather, temperature, humidity, wind velocity, or the like). For example, it may be necessary to be careful for a location in which puddles are easily generated there in rainy weather while the location is safe in fine whether.

Thus, the monitoring point information storage unit 3020 stores a monitoring point in association with the state of a monitoring target and weather information. The monitoring point acquisition unit 2040 acquires weather information in addition to the state of the monitoring target, and acquires a monitoring point corresponding to a combination of the state and the information. Thereby, it is possible to acquire an appropriate monitoring point based on the weather at the time of monitoring. Note that, weather information to be acquired may be information indicating the actual weather at that time or may be prediction information of weather indicated by a weather forecast or the like.

<Event Information>

In addition, for example, a second element is information regarding an event that is performed at or around a monitoring place or the like (hereinafter, event information). In a case of monitoring a place in which any event is held, such as a stadium in which a game is played, a place to be monitored may varies according to the state of the event and the result thereof. For example, in the case of a stadium in which a game is played, there is high possibility of that a large number of irritated supporters exist at rooters' seats of a team that has lost the game, around a passage toward an exit from the rooters' seats, or the like, which results in a high necessity of monitoring.

Thus, the monitoring point information storage unit 3020 stores a monitoring point in association with the state of a monitoring target and event information. The monitoring point acquisition unit 2040 acquires event information (information regarding which team has won, and the like) at the time of monitoring in addition to the state of a monitoring target, and acquires a monitoring point corresponding to a combination of the state and the information. Thereby, it is possible to acquire an appropriate monitoring point based on conditions of an event at the time of monitoring. Note that, event information to be acquired may be information indicating actual conditions of an event at that time, or may be expected conditions of an event. For example, when an event is a game and monitoring is performed at the time of a final stage of the game, the "expected conditions of an event" are a result of the game which is expected on the basis of the situation of the game at that time, and the like.

<Flow of Processing>

Figure 14:
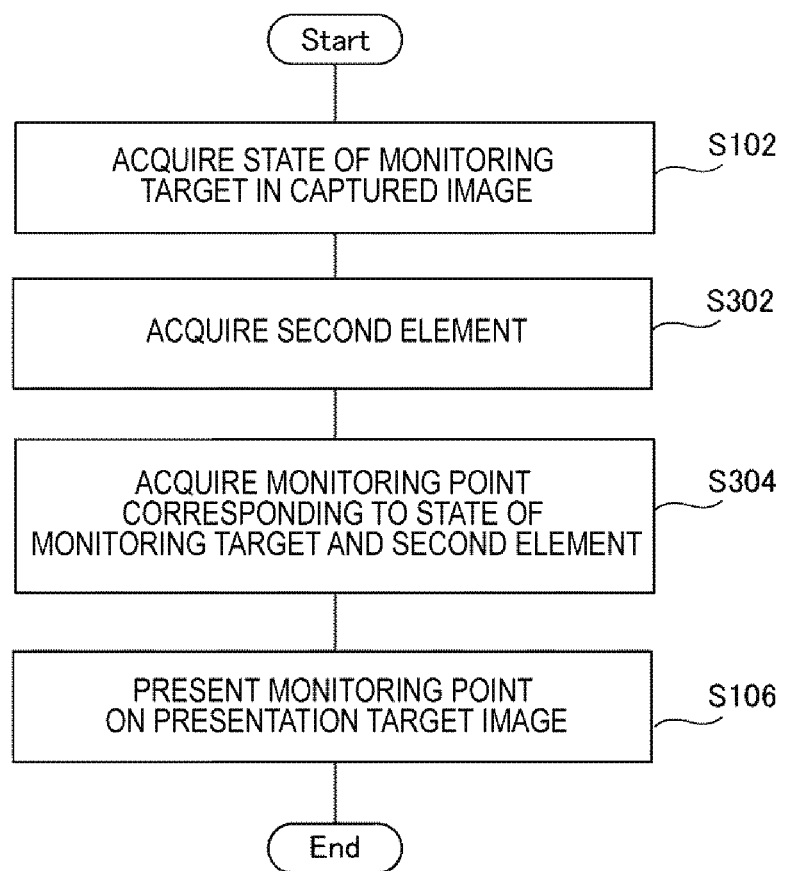
FIG. 14 is a flow chart illustrating a flow of processing that an image processing apparatus according to a third exemplary embodiment performs.

FIG. 14 is a flow chart illustrating a flow of processing performed by the image processing apparatus 2000 according to the third exemplary embodiment. Note that, step S102 and S106 of FIG. 14 are the same processes as step S102 and S106 of FIG. 2, respectively, and thus those processes will not be described here.

In step S302, the monitoring point acquisition unit 2040 acquires a second element. In step S304, the monitoring point acquisition unit 2040 acquires a monitoring point corresponding to the state of a monitoring target and the second element.

<Operational Advantages>

According to the present exemplary embodiment, a monitoring point is acquired in consideration of a second element such as weather information, in addition to the state of a monitoring target. In this manner, it is possible to present an indication of a monitoring point which is more appropriate for conditions at that time, as compared to a case where a monitoring point is acquired solely on the basis of the state of a monitoring target. As a result, an observer can perform more appropriate monitoring in accordance with conditions at the time of monitoring.

Fourth Exemplary Embodiment

Figure 15:
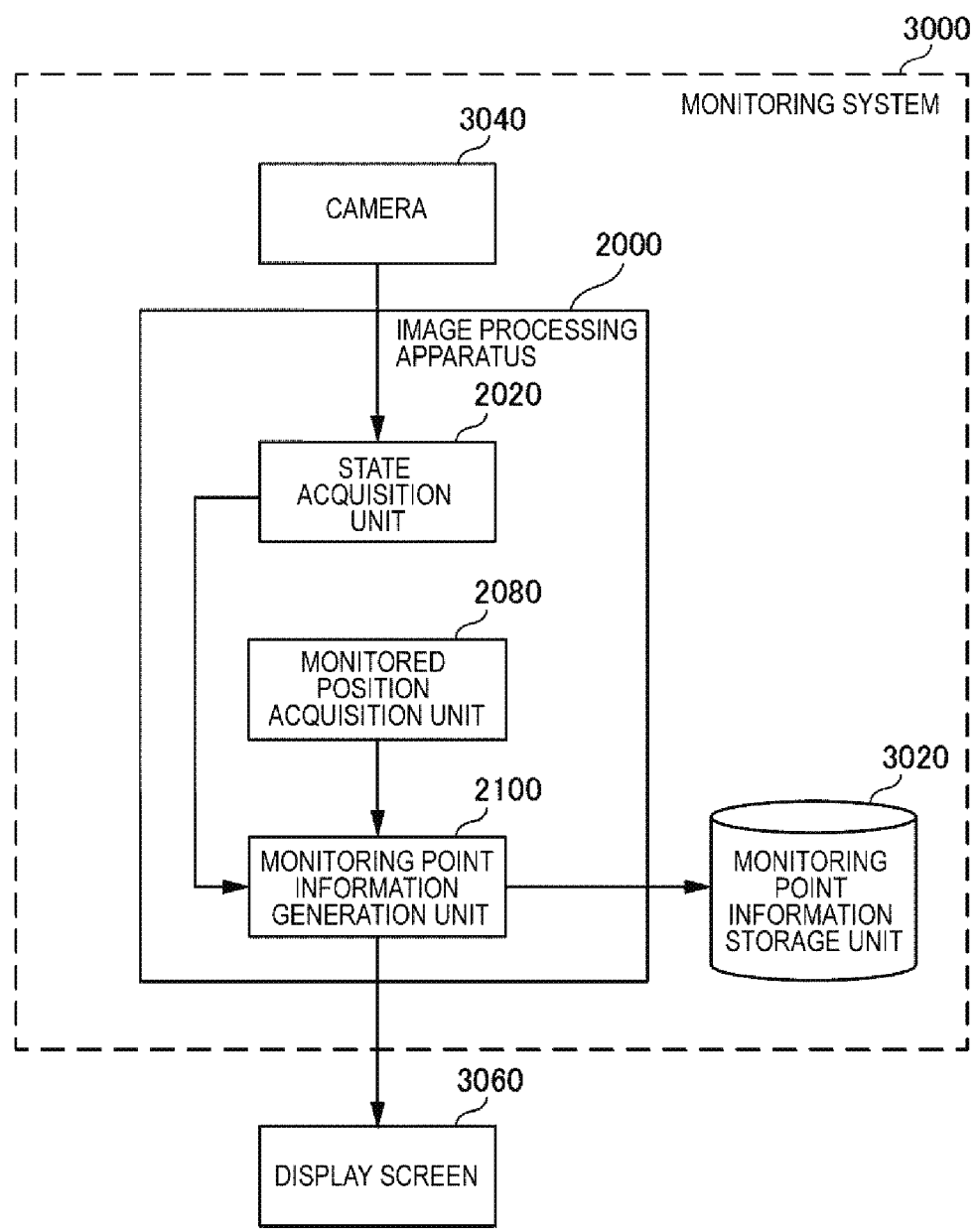
FIG. 15 is a block diagram illustrating an image processing apparatus according to a fourth exemplary embodiment.

FIG. 15 is a block diagram illustrating an image processing apparatus 2000 according to a fourth exemplary embodiment. In FIG. 15, an arrow indicates a flow of information. Further, in FIG. 15, each block indicates a function-based configuration instead of a hardware-based configuration.

The image processing apparatus 2000 according to the fourth exemplary embodiment includes a state acquisition unit 2020 described in the first exemplary embodiment and a monitored position acquisition unit 2080 described in the second exemplary embodiment. Further, the image processing apparatus 2000 according to the fourth exemplary embodiment includes a monitoring point information generation unit 2100. The monitoring point information generation unit 2100 handles a monitored position acquired by the monitored position acquisition unit 2080 as a monitoring point, and generates monitoring point information by associating the state of a monitoring target acquired by the state acquisition unit 2020 with the above-mentioned monitoring point. The monitoring point information generated by the monitoring point information generation unit 2100 is stored in a monitoring point information storage unit 3020.

Suppose that information indicating the state of a monitoring target (state information) indicates a state of "a queue is aligned", and that an observer is monitoring the end of a queue. In this case, the monitoring point information generation unit 2100 generates monitoring point information by associating a monitoring point of the "end" with the state of "a queue is aligned".

<Association Between State Information and Monitored Position>

For example, the monitoring point information generation unit 2100 associates pieces of state information with monitored positions in order for the acquisition thereof. Specifically, the monitoring point information generation unit 2100 generates monitoring point information by associating n-th state information with an n-th monitored position. This method is used, for example, when pieces of state information and monitored positions are sequentially acquired in real time.

In addition, for example, the monitoring point information generation unit 2100 may associate state information with a monitored position generated at the time close to the time when the state information is generated. In this case, the state acquisition unit 2020 acquires state information in association with the time when the state information is generated. Similarly, the monitored position acquisition unit 2080 acquires a monitored position in association with the time when the position is generated. Note that, the phrase "the time of generation being close to each other" means that, for example, a difference between the times of generation is equal to or less than a pre-determined time. For example, this method is used when a plurality of pieces of state information and monitored positions are temporarily stored in a storage device or the like and then monitoring point information is generated through batch processing. However, this method may be used when pieces of state information and monitored positions are sequentially acquired in real time.

<Use of Monitoring Results of Plurality of Monitoring People>

The monitoring point information generation unit 2100 may generate monitoring point information on the basis of a plurality of monitoring people's monitoring actions. In this case, the monitoring point information generation unit 2100 may determine the importance of a monitoring point and may generate monitoring point information solely with respect to monitoring points having high importance. Specifically, first, the monitoring point information generation unit 2100 generates a candidate of monitoring point information (hereinafter, candidate information) by associating "the state of a monitoring target acquired by the state acquisition unit 2020, a monitored position acquired by the monitored position acquisition unit 2080, and an ID of an observer having performed monitoring" with each other. When the number of pieces of candidate information indicating the same combination of "the state of a monitoring target and a monitored position" is equal to or greater than a pre-determined number, the monitoring point information generation unit 2100 handles the combination as monitoring point information. In this case, the number of pieces of candidate information, that is, the number of monitoring people who monitor a certain monitored position is handled as importance of a monitoring point corresponding to the monitored position.

In the above-mentioned method, weighting may be performed in association with an ID of an observer. Specifically, the monitoring point information generation unit 2100 sums the weight of an observer corresponding to each piece of candidate information each of which shows the same combination of "the state of a monitoring target and a monitored position". When the sum is equal to or greater than a pre-determined value, the combination of "the state of a monitoring target and a monitored position" is handled as monitoring point information. For example, the weight corresponding to an ID of an observer is determined in advance in accordance with the level of the observer's skill. In this case, the sum calculated for a certain monitored position is handled as importance of a monitoring point corresponding to the monitored position.

<Flow of Processing>

Figure 16:
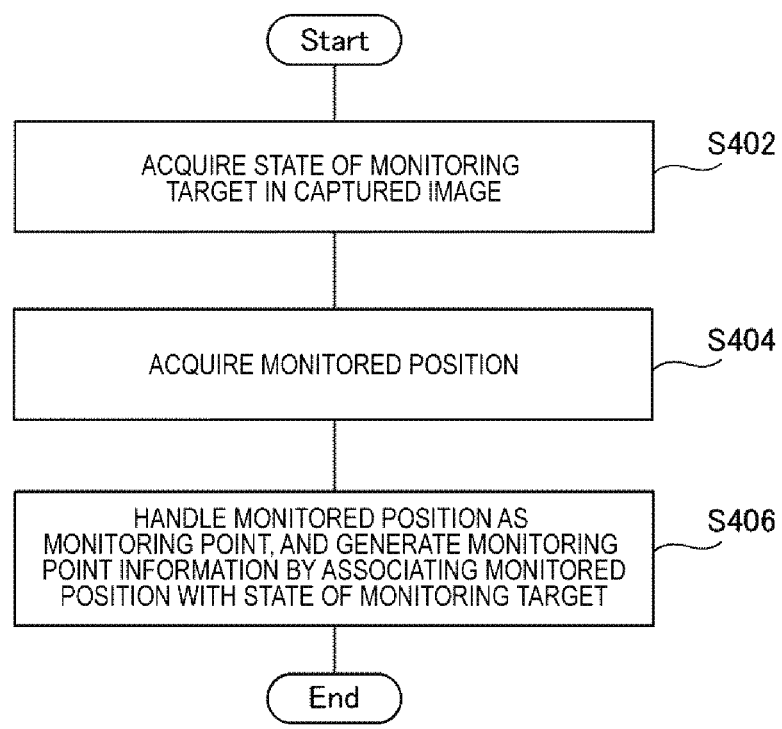
FIG. 16 is a flow chart illustrating a flow of processing that the image processing apparatus according to the fourth exemplary embodiment performs.

FIG. 16 is a flow chart illustrating a flow of processing performed by the image processing apparatus 2000 according to the fourth exemplary embodiment. In step S402, the state acquisition unit 2020 acquires the state of a monitoring target in a captured image. In step S404, the monitored position acquisition unit 2080 acquires a monitored position.

In step S406, the monitoring point information generation unit 2100 generates monitoring point information by associating a monitored position acquired by the monitored position acquisition unit 2080 with the state of a monitoring target acquired by the state acquisition unit 2020.

<Operational Advantages>

According to the present exemplary embodiment, monitoring point information is generated on the basis of the state of a monitoring target in a captured image and a position monitored by an observer who is monitoring the captured image. In other words, the observer's monitoring action is learned by the image processing apparatus 2000, and monitoring point information is generated as a result of the learning. In this manner, labor required for manually creating monitoring point information is reduced.

For example, as a method of operating the image processing apparatus 2000 of the present exemplary embodiment, an operation method of generating monitoring point information by learning a highly skilled observer's monitoring action is considered. The monitoring point information generated in this manner is used by the image processing apparatuses 2000 according to the first to third exemplary embodiments. In this manner, monitoring people can share information regarding "what location a highly skilled observer is monitoring in what state of a monitoring target". Accordingly, even when the observers' skills vary, it is possible to efficiently perform monitoring without neglecting. In addition, it is possible to reduce training costs required to train a new observer.

The exemplary embodiments of the invention have been described so far with reference to the accompanying drawings. However, the exemplary embodiments are merely illustrative of the invention, and other various configurations can also be adopted.

Hereinafter, examples of reference configurations will be added.

(1) An image processing apparatus including:

a state acquisition unit acquiring a state of a monitoring target in a captured image captured by a camera;

a monitoring point acquisition unit acquiring a monitoring point corresponding to the state of the monitoring target acquired by the state acquisition unit, the monitoring point indicating a position to be monitored in the captured image, and being acquired from a monitoring point information storage unit storing the state of the monitoring target and the monitoring point in association with each other; and a presentation unit presenting the monitoring point acquired by the monitoring point acquisition unit on a first captured image captured by the camera.

(2) The image processing apparatus according to (1), further including a monitored position acquisition unit acquiring a monitored position, which is a position monitored by an observer viewing a display screen on which the captured image is displayed, wherein the presentation unit preferentially presents, on the first captured image, a monitoring point whose presentation location is not at or around the monitored position on the display screen, the monitoring point being acquired by the monitoring point acquisition unit.

(3) The image processing apparatus according to (2), wherein the monitored position acquisition unit handles, as the monitored position, any one or more of: a position on the display screen corresponding to an eye gaze direction of the observer; a position on the display screen corresponding to a direction indicated by a finger or hand of the observer; and a position on the display screen touched by the observer.

(4) The image processing apparatus according to any one of (1) to (3), wherein the state acquisition unit acquires a degree of congestion of a crowd as the state of the monitoring target.

(5) The image processing apparatus according to any one of (1) to (4), wherein the state acquisition unit acquires a movement state of a crowd as the state of the monitoring target.

(6) The image processing apparatus according to any one of (1) to (5), wherein the state acquisition unit acquires an alignment state of a queue as the state of the monitoring target.

(7) The image processing apparatus according to any one of (1) to (6), wherein the monitoring point information storage unit further stores the state of the monitoring target and the monitoring point in association with schedule information, and wherein the monitoring point acquisition unit acquires the monitoring point corresponding to the state of the monitoring target acquired by the state acquisition unit and schedule information corresponding to a time at which the captured image is captured.

(8) The image processing apparatus according to any one of (1) to (7), wherein the monitoring point information storage unit further stores the state of the monitoring target and the monitoring point in association with weather information, and wherein the monitoring point acquisition unit acquires the monitoring point corresponding to the state of the monitoring target acquired by the state acquisition unit and weather information indicating weather at a time of the captured image being captured.

(9) The image processing apparatus according to any one of (1) to (8), wherein the monitoring point information storage unit further stores the state of the monitoring target and the monitoring point in association with a state of an event occurring at a place where the camera is installed, and wherein the monitoring point acquisition unit acquires the monitoring point corresponding to the state of the monitoring target acquired by the state acquisition unit and the state of the event at the time of the captured image being captured.

(10) An image processing apparatus including:

a state acquisition unit acquiring a state of a monitoring target in a captured image captured by a camera;

a monitored position acquisition unit acquiring a monitored position, which is a position monitored by an observer viewing a display screen on which the captured image is displayed; and a monitoring point information generation unit handling the monitored position as a monitoring point, and generating monitoring point information by associating the monitoring point with the state of the monitoring target, the monitoring point indicating a position to be monitored in the captured image.

(11) The image processing apparatus according to (10), wherein the monitored position acquisition unit acquires monitored positions with respect to a plurality of observers, and wherein the monitoring point information generation unit determines importance of a monitoring point corresponding to the monitored position based on the number of the observers having monitored the monitored position.

(12) The image processing apparatus according to (10), wherein the monitored position acquired with respect to an observer is weighted based on a level of a skill of the observer, and wherein the monitoring point information generation unit determines importance of a monitoring point corresponding to the monitored position based on a weighted sum of the monitored position.

(13) A monitoring system including the camera, the monitoring point information storage unit, and the image processing apparatus according to any one of (1) to (9).

(14) A monitoring system including the camera and the image processing apparatus according to any one of (10) to (12).

(15) An image processing method performed by a computer, the method including:

acquiring a state of a monitoring target in a captured image captured by a camera;

acquiring a monitoring point corresponding to the state of the monitoring target acquired by the step of acquiring the state of the monitoring target, the monitoring point indicating a position to be monitored in the captured image, and being acquired from a monitoring point information storage unit storing the state of the monitoring target and the monitoring point in association with each other; and presenting the monitoring point acquired by the step of acquiring the monitoring point on a first captured image captured by the camera.

(16) The image processing method according to (15), further including acquiring a monitored position, which is a position monitored by an observer viewing a display screen on which the captured image is displayed, wherein the step of presenting the monitoring point preferentially presents, on the first captured image, a monitoring point the presentation location of which is not at or around the monitored position on the display screen, the monitoring point being acquired by the step of acquiring the monitoring point.

(17) The image processing method according to (16), wherein the step of acquiring the monitored position includes handling, as the monitored position, any one or more of: a position on the display screen corresponding to an eye gaze direction of the observer; a position on the display screen corresponding to a direction indicated by a finger or hand of the observer; and a position on the display screen touched by the observer.

(18) The image processing method according to any one of (15) to (17), wherein the step of acquiring the state of the monitoring target includes acquiring a degree of congestion of a crowd as the state of the monitoring target.

(19) The image processing method according to any one of (15) to (18), wherein the step of acquiring the state of the monitoring target includes acquiring a movement state of a crowd as the state of the monitoring target.

(20) The image processing method according to any one of (15) to (19), wherein the step of acquiring the state of the monitoring target includes acquiring an alignment state of a queue as the state of the monitoring target.

(21) The image processing method according to any one of (15) to (20), wherein the monitoring point information storage unit further stores the state of the monitoring target and the monitoring point in association with schedule information, and wherein the step of acquiring the monitoring point includes acquiring the monitoring point corresponding to the state of the monitoring target which is acquired in the step of acquiring the state of the monitoring target and schedule information corresponding to time at which the captured image is captured.

(22) The image processing method according to any one of (15) to (21), wherein the monitoring point information storage unit further stores the state of the monitoring target and the monitoring point in association with weather information, and wherein the step of acquiring the monitoring point includes acquiring the monitoring point corresponding to the state of the monitoring target which is acquired in the step of acquiring the state of the monitoring target and weather information indicating weather at a time of the captured image being captured.

(23) The image processing method according to any one of (15) to (22), wherein the monitoring point information storage unit further stores the state of the monitoring target and the monitoring point in association with a state of an event that occurs at a place where the camera is installed, and wherein the step of acquiring the monitoring point includes acquiring the monitoring point corresponding to the state of the monitoring target which is acquired in the step of acquiring the state of the monitoring target and the state of the event at a time of the captured image being captured.

(24) An image processing method performed by a computer, the method including:

acquiring a state of a monitoring target in an image captured by a camera;

acquiring a monitored position, which is a position monitored by an observer viewing a display screen on which the captured image is displayed; and handling the monitored position as a monitoring point, and generating monitoring point information by associating the monitoring point with the state of the monitoring target, the monitoring point indicating a position to be monitored in the captured image.

(25) The image processing method according to (24), wherein the step of acquiring the monitored position includes acquiring a monitored position with respect to a plurality of observers, and wherein the step of generating monitoring point information includes determining importance of a monitoring point corresponding to the monitored position based on the number of the observers having monitored the monitored position.

(26) The image processing method according to (25), wherein the monitored position acquired with respect to an observer is weighted based on a level of a skill of the observer, and wherein the step of generating monitoring point information includes determining importance of a monitoring point corresponding to the monitored position based on a weighted sum of the monitored position.

(27) A program causing a computer to operate as the image processing apparatus according to any one of (1) to (12).

It is apparent that the present invention is not limited to the above embodiment, and may be modified and changed without departing from the scope and spirit of the invention.

This application claims priority from Japanese Patent Application No. 2014-152336, filed on Jul. 25, 2014, the entire contents of which are incorporated herein.

The invention claimed is:

1. A monitoring system including:
   at least one non-transitory computer-readable medium storing instructions; and
   at least one processor configured to execute the instructions to perform:
      acquiring a degree of congestion of a crowd in an image which is one of captured images, wherein the degree of congestion of the crowd is one of three or more levels;
      acquiring a monitoring point that varies depending on the degree of congestion of the crowd, the monitoring point indicating a position to be monitored in the image, wherein the monitoring point corresponds to one of the three or more levels of degree of congestion of the crowd; and
      presenting the monitoring point on a first captured image which is one of captured images.

2. The monitoring system according to claim 1, wherein when the degree of congestion of the crowd is lower than a threshold, acquiring an entrance as the monitoring point corresponding to the degree of congestion of the crowd, and
   when the degree of congestion of the crowd is not lower than the threshold, acquiring, as the monitoring point, an area where people are crowded or an area where people pass.

3. The monitoring system according to claim 1, wherein the correspondence between the degree of congestion of the crowd and the monitoring point is determined on the basis of characteristics of a place in the captured image, or characteristics of people using the place.

4. The monitoring system according to claim 1, wherein the at least one processor is further configured to perform:
   acquiring a monitored position, which is a position monitored by an observer viewing a display screen on which the captured image is displayed; and
   preferentially presenting, on the first captured image, a monitoring point whose presentation location is not at or around the monitored position on the display screen.

5. The monitoring system according to claim 4, wherein the monitored position includes any one or more of: a position on the display screen corresponding to an eye gaze direction of the observer; a position on the display screen corresponding to a direction indicated by a finger or hand of the observer; and a position on the display screen touched by the observer.

6. The monitoring system according to claim 1, further comprising:
   a monitoring point information storage storing the degree of congestion of the crowd and the monitoring point in association with each other.

7. The monitoring system according to claim 6, wherein the monitoring point information storage further stores the degree of congestion of the crowd and the monitoring point in association with schedule information, and
   the at least one processor is configured to perform acquiring the monitoring point corresponding to the degree of congestion of the crowd and the schedule information corresponding to a time at which the captured image is captured.

8. The monitoring system according to claim 6, wherein the monitoring point information storage further stores the degree of congestion of the crowd and the monitoring point in association with weather information, and the at least one processor is configured to perform acquiring the monitoring point corresponding to the degree of congestion of the crowd and the weather information indicating weather at a time of the captured image being captured.

9. The monitoring system according to claim 6, wherein the monitoring point information storage further stores the degree of congestion of the crowd and the monitoring point in association with a state of an event occurring at a place where a camera is installed, and
the at least one processor is configured to perform acquiring the monitoring point corresponding to the degree of congestion of the crowd and the state of the event at the time of the captured image being captured.

10. A monitoring method including:
acquiring a degree of congestion of a crowd in an image which is one of captured images, wherein the degree of congestion of the crowd is one of three or more levels;
acquiring a monitoring point that varies depending on the degree of congestion of the crowd, the monitoring point indicating a position to be monitored in the image, wherein the monitoring point corresponds to one of the three or more levels of degree of congestion of the crowd; and
presenting the monitoring point on a first captured image which is one of captured images.

11. The monitoring method according to claim 10, wherein
when the degree of congestion of the crowd is lower than a threshold, acquiring an entrance as the monitoring point corresponding to the degree of congestion of the crowd, and
when the degree of congestion of the crowd is not lower than the threshold, acquiring, as the monitoring point, an area where people are crowded or an area where people pass.

12. The monitoring method according to claim 10, wherein
the correspondence between the degree of congestion of the crowd and the monitoring point is determined on the basis of characteristics of a place in the captured image, or characteristics of people using the place.

13. A non-transitory computer-readable medium storing programs causing a processing device to perform:
acquiring a degree of congestion of a crowd in an image which is one of captured images, wherein the degree of congestion of the crowd is one of three or more levels;
acquiring a monitoring point that varies depending on the degree of congestion of the crowd, the monitoring point indicating a position to be monitored in the image, wherein the monitoring point corresponds to one of the three or more levels of degree of congestion of the crowd; and
presenting the monitoring point on a first captured image which is one of captured images.

14. The non-transitory computer-readable medium according to claim 13, wherein
the program causes the processor device to perform:
when the degree of congestion of the crowd is lower than a threshold, acquiring an entrance as the monitoring point corresponding to the degree of congestion of the crowd, and
when the degree of congestion of the crowd is not lower than the threshold, acquiring, as the monitoring point, an area where people are crowded or an area where people pass.

15. The non-transitory computer-readable medium according to claim 13, wherein
the correspondence between the degree of congestion of the crowd and the monitoring point is determined on the basis of characteristics of a place in the captured image, or characteristics of people using the place.

* * * * *